(12) United States Patent
Tojo et al.

(10) Patent No.: US 8,737,740 B2
(45) Date of Patent: May 27, 2014

(54) INFORMATION PROCESSING APPARATUS, INFORMATION PROCESSING METHOD, AND NON-TRANSITORY COMPUTER-READABLE STORAGE MEDIUM

(75) Inventors: Hiroshi Tojo, Fuchu (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/455,601

(22) Filed: Apr. 25, 2012

(65) Prior Publication Data

US 2012/0288198 A1    Nov. 15, 2012

(30) Foreign Application Priority Data

May 11, 2011    (JP) ................. 2011-106628

(51) Int. Cl.
*G06K 9/34*    (2006.01)
(52) U.S. Cl.
USPC ........................................ 382/173
(58) Field of Classification Search
USPC .................. 382/103, 117, 159, 173, 190, 206
See application file for complete search history.

(56) References Cited

U.S. PATENT DOCUMENTS

| 6,424,752 | B1 | 7/2002 | Katayama et al. |
| 6,549,681 | B1 | 4/2003 | Takiguchi et al. |
| 6,608,926 | B1 | 8/2003 | Suwa et al. |
| 6,621,921 | B1 | 9/2003 | Matsugu et al. |
| 6,647,157 | B1 | 11/2003 | Shiiyama et al. |
| 6,694,051 | B1 | 2/2004 | Yamazoe et al. |
| 6,704,041 | B2 | 3/2004 | Katayama et al. |
| 6,731,789 | B1 | 5/2004 | Tojo |
| 7,071,974 | B2 | 7/2006 | Tojo |
| 7,272,269 | B2 | 9/2007 | Tojo et al. |
| 7,623,259 | B2 | 11/2009 | Tojo |
| 7,983,528 | B2 | 7/2011 | Sohma et al. |
| 8,203,748 | B2 | 6/2012 | Tojo |
| 2007/0237387 | A1 | 10/2007 | Avidan et al. |
| 2009/0290020 | A1 | 11/2009 | McLeish et al. |
| 2011/0090358 | A1 | 4/2011 | Tojo |

FOREIGN PATENT DOCUMENTS

| JP | 2913882 B2 | 6/1999 |
| JP | 2002-099909 A | 4/2002 |

*Primary Examiner* — Duy M Dang
(74) *Attorney, Agent, or Firm* — Fitzpatrick, Cella, Harper & Scinto

(57) ABSTRACT

There is provided an information processing apparatus for detecting a foreground portion from an acquired image. Feature-amount information of a past acquired image and likelihood information indicating a probability that a subject is represented is stored as background-model information. A foreground region is detected based on the likelihood information and a result of comparing the feature amount extracted from the acquired image with the feature-amount information contained in the background-model information. For each of the detected foreground region, a likelihood indicating a probability that the region represents the subject is calculated based on information prepared in advance related to the subject.

17 Claims, 18 Drawing Sheets

FIG. 5

| MANAGEMENT INFORMATION | POSITION | POINTER TO STATUS |
|---|---|---|
| | (0, 0) | 1200 |
| | (1, 0) | 1202 |
| | (2, 0) | 1204 |
| | ... | ... |

| BACKGROUND MODEL INFORMATION | STATUS NUMBER | FEATURE AMOUNT INFORMATION | CREATION TIME | APPEARANCE TIME | LIKELIHOOD INFORMATION |
|---|---|---|---|---|---|
| ADDRESS 1200 | 1 | 100 | 0 | 300 | 0 |
| ADDRESS 1201 | 2 | 230 | 101 | 15 | 10 |
| ADDRESS 1202 | 1 | 10 | 0 | 295 | 0 |
| ADDRESS 1203 | 2 | 211 | 180 | 20 | 85 |
| ADDRESS 1204 | 1 | 50 | 0 | 315 | 0 |
| ... | ... | ... | ... | ... | ... |

FIG. 6

| POSITION | STATUS NUMBER | FEATURE AMOUNT OF ACQUIRED IMAGE | CREATION TIME | APPEARANCE TIME | LIKELIHOOD INFORMATION | SMALLEST DIFFERENCE VALUE |
|---|---|---|---|---|---|---|
| (0, 0) | 1 | 105 | 0 | 300 | 0 | 5 |
| (1, 0) | 2 | 203 | 180 | 20 | 85 | 8 |
| (2, 0) | 1 | 240 | 0 | 315 | 0 | 190 |
| ... | ... | ... | ... | ... | ... | ... |

FIG. 8

| POSITION | STATUS NUMBER | FEATURE AMOUNT OF ACQUIRED IMAGE | CREATION TIME | APPEARANCE TIME | LIKELIHOOD INFORMATION |
|---|---|---|---|---|---|
| (0, 0) | 1 | 105 | 0 | 301 | 0 |
| (1, 0) | 2 | 203 | 180 | 21 | 85 |
| (2, 0) | 0 | 240 | 316 | 1 | 0 |
| ... | ... | ... | ... | ... | ... |

FIG. 10

| POSITION | FOREGROUND FLAG |
|---|---|
| (0, 0) | 0 |
| (1, 0) | 1 |
| (2, 0) | 1 |
| ⋮ | ⋮ |

FIG. 11

| | NUMBER OF FOREGROUND REGIONS | | |
|---|---|---|---|
| | 2 | | |
| | POINTER | | |
| | 1400 | | |
| | UPPER LEFT POSITION OF FOREGROUND REGION | LOWER RIGHT POSITION OF FOREGROUND REGION | AVERAGE APPEARANCE TIME |
| ADDRESS 1400 | (10, 15) | (40, 75) | 10 |
| ADDRESS 1401 | (80, 16) | (110, 74) | 100 |

F I G. 13

| NUMBER OF OBJECT REGIONS | | | |
|---|---|---|---|
| | | | 2 |
| POINTER | | | |
| | | | 1600 |
| UPPER LEFT POSITION OF OBJECT REGION | LOWER RIGHT POSITION OF OBJECT REGION | AVERAGE APPEARANCE TIME | SUBJECT FLAG |
| ADDRESS 1600 (10, 15) | (40, 75) | 10 | 1 |
| ADDRESS 1601 (80, 16) | (110, 74) | 100 | 0 |

| POSITION | ACCUMULATED SCORE |
|---|---|
| (0, 0) | 20 |
| (1, 0) | 1000 |
| ⋮ | ⋮ |

| POSITION | SUBJECT LIKELIHOOD |
|---|---|
| (0, 0) | 0 |
| (1, 0) | 85 |
| ⋮ | ⋮ |

INFORMATION PROCESSING APPARATUS, INFORMATION PROCESSING METHOD, AND NON-TRANSITORY COMPUTER-READABLE STORAGE MEDIUM

BACKGROUND OF THE INVENTION

1. Field of the Invention

The present invention relates to an information processing apparatus, an information processing method, and a non-transitory computer-readable storage medium and, more particularly, to an information processing apparatus, information processing method, and computer-readable non-transitory storage medium which are applied to an apparatus or method for detecting a specific subject such as a person from an image.

2. Description of the Related Art

As a technique of detecting an object from an image captured by a camera, a method of detecting a moving object using a background-difference method is known. In the background-difference method, a fixed camera captures a background image with no subject and its feature amount is stored as a background model. Then, the feature amount of an image input by the camera is compared with the feature amount of the background model, and a region of the input image, which has a feature amount different from that of the background model, is detected as the foreground (an object).

The background may change with time. For example, the brightness of the background changes according to a change in illumination. In this case, there is a difference between the background of an image captured by the camera and a background image previously captured and stored, thereby disabling normal detection. In Japanese Patent Laid-Open No. 2002-099909, to reduce the influence of a change in background, a background model is updated at given intervals. Furthermore, Japanese Patent Laid-Open No. 2002-099909 discloses a method of excluding from background-update target regions, when an intrusion object is detected, a region in which the intrusion object has been detected in order to prevent the intrusion object from being considered as the background in an update process. Japanese Patent No. 2913882 discloses a method of updating a background image based on an input image using an exponential smoothing method.

Assume that a static object, such as a bag or vase, newly appears. Such an object may be continuously detected for a while, since a person may have left it behind or abandoned it. On the other hand, an object which has remained for a long time may be considered as part of the background. In Japanese Patent Laid-Open No. 2002-099909, however, since the background is not updated with respect to a region where an intrusion object has been detected, the region is continuously detected as the foreground all the time. If it is desirable to deal with the remaining object as the background later, it is necessary to initialize the background model. In Japanese Patent No. 2913882, any type of object that has newly appeared is dealt with as the background after a predetermined period of time elapses. Therefore, the user cannot change, depending on the situation or the type of object to be detected, a time during which the object is continuously detected.

U.S. Publication No. 2009/0290020 discloses a method of detecting an object using, as a condition for determining the foreground and background in a captured image, time information indicating how long an image feature amount exists in a video, as well as a difference between image feature amounts. In U.S. Publication No. 2009/0290020, therefore, not only the feature amount of the background, but also the feature amount of a detected object is held as the status of a background model. Every time the feature amount of the object appears in a video, time information corresponding to the feature amount is updated. If, for example, a red bag is placed, a status indicating a red feature amount is added as the status of the background. If, then, the red bag remains there, the status indicating the red feature amount always exists at the same position in the video, and therefore, the time information is updated every time its existence is identified. This enables the detection of the red bag as an object not considered part of the background before a predetermined period of time elapses, and treats the red bag as part of the background after the predetermined period of time elapses.

In a certain place, such as a waiting room, however, a person often stops at one place for a certain period of time, and then starts moving. Even though time information is added as an object-determination condition, as in U.S. Publication No. 2009/0290020, a person is unwantedly considered as the background if he/she continues to stop longer than the predetermined period of time. Consequently, it becomes impossible to detect the person even if a person is always a detection target. Similarly, in Japanese Patent No. 2913882, a person who continues to stop is considered as the background, thereby disabling the detection of the person. On the other hand, according to Japanese Patent Laid-Open No. 2002-099909, a person is always detected, but an object left behind that should be dealt with as the background is unwantedly continuously detected for an indefinite time, as described above. As a result, in the conventional techniques, it is impossible to temporarily detect a static object (an object left behind or an abandoned object) while constantly detecting a specific subject, such as a person.

The present invention has been made in consideration of the above problems. The present invention provides a technique of detecting, as the foreground, a region that is probably considered as a subject in an image.

SUMMARY OF THE INVENTION

According to one aspect of the present invention, there is provided an information processing apparatus comprising: a storage unit configured to store, as background-model information, for each of a plurality of predetermined regions, feature-amount information of a past acquired image and likelihood information indicating a probability that a subject is represented; an acquisition unit configured to acquire an image of an analysis object; an extraction unit configured to extract a feature amount by analyzing the image of the analysis object for each region; a detection unit configured to detect a foreground region from the image of the analysis object based on the likelihood information contained in the background-model information and a result of comparing the feature amount extracted from the image of the analysis object with the feature-amount information contained in the background-model information; a calculation unit configured to calculate, for each of the detected foreground region, a likelihood indicating a probability that the region represents the subject, based on information prepared in advance for the subject; and an update unit configured to update the likelihood information contained in the background-model information with the calculated likelihood.

According to one aspect of the present invention, there is provided an information processing method for an information processing apparatus which includes a storage unit configured to store, as background-model information, for each of a plurality of predetermined regions, feature-amount information of a past acquired image and likelihood information indicating a probability that a subject is represented. The method comprises the steps of: acquiring an image of an analysis object; extracting a feature amount by analyzing the image of the analysis object for each region; comparing the feature amount extracted from the image of the analysis object with the feature-amount information contained in the background-model information, and detecting a foreground region from the image of the analysis object based on the likelihood information contained in the background-model information; calculating, for each of the detected foreground region, a likelihood indicating a probability that the region represents the subject, based on information prepared in advance for the subject; and updating the likelihood information contained in the background-model information with the calculated likelihood.

Further features of the present invention will be apparent from the following description of exemplary embodiments with reference to the attached drawings.

BRIEF DESCRIPTION OF THE DRAWINGS

FIG. 5 is a table showing an example of a background model;

FIG. 6 is a table showing an example of smallest-difference-value information;

FIG. 8 is a table showing an example of status-determination information;

FIG. 10 is a table showing an example of foreground-flag information;

FIG. 11 is a table showing an example of foreground-region information;

FIG. 13 is a table showing an example of object-region information;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Each embodiment of the present invention will be described below with reference to the accompanying drawings.

(Hardware Configuration)

Figure 1:
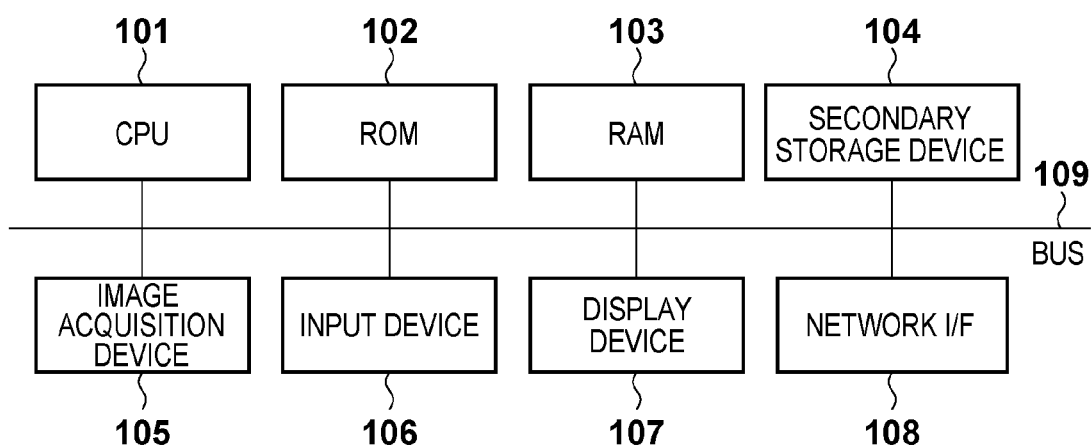
FIG. 1 is a block diagram showing the hardware configuration of an information processing apparatus according to an embodiment.

FIG. 1 is a block diagram showing the hardware configuration of an information processing apparatus according to an embodiment of the present invention. The information processing apparatus according to the embodiment includes a CPU 101, a ROM 102, a RAM 103, a secondary storage device 104, an image acquisition device 105, an input device 106, a display device 107, a network interface (network I/F) 108, and a bus 109.

The CPU 101 is an arithmetic unit for executing an instruction according to a program stored in the ROM 102 or RAM 103. The ROM 102 is a nonvolatile memory, which stores the program of the present invention, and programs and data necessary for other control operations. The RAM 103 is a volatile memory, which stores temporary data such as image data and a pattern classification result. The secondary storage device 104 is a rewritable secondary storage device, such as a hard disk drive or flash memory. The secondary storage device stores image information, information-processing programs, various setting contents, and the like. The stored information is transferred to the RAM 103 to be used by the CPU 101.

The image acquisition device 105 acquires an image captured by an image capturing apparatus such as a digital video camera, a network camera, or an infrared camera. The image acquisition device 105 may acquire captured images accumulated in the hard disk or the like. The input device 106 is, for example, a keyboard, a mouse, or buttons attached to the camera, which accepts a user input and acquires input information. The input device 106 may include, for example, a microphone and a voice recognition unit, and may accept a user input by voice and acquire input information. The display device 107 is a device for visually or audibly presenting information to the user, such as a cathode-ray tube (CRT) display, a liquid crystal display, or a loudspeaker, which, for example, displays a processing result on a screen. The network I/F 108 is, for example, a modem for connecting to a network such as the Internet or an intranet. The bus 109 connects the above components to input and output data. The information processing apparatus according to the embodiment is implemented as an application operating on an operating system.

(Functional Configuration)

Figure 2:
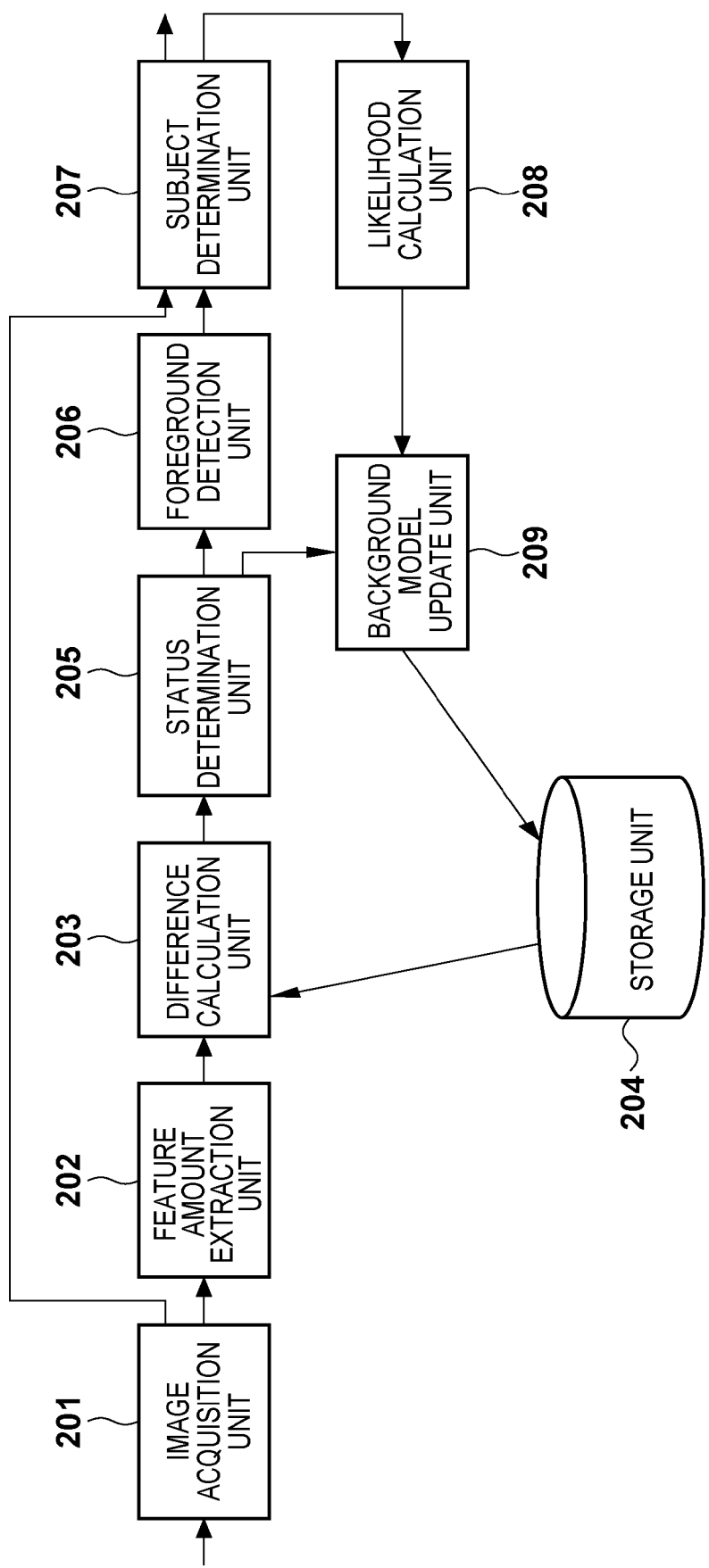
FIG. 2 is a block diagram showing the functional configuration of the information processing apparatus according to the embodiment.

FIG. 2 is a block diagram showing the functional configuration of the information processing apparatus according to the embodiment. Reference numeral 201 denotes an image acquisition unit which uses the image acquisition device 105 to acquire the image of an analysis object; reference numeral 202 denotes a feature amount extraction unit which analyzes the image (to be referred to as the "acquired image" hereinafter) acquired by the image acquisition unit 201 to extract a feature amount included in the image; and reference numeral 203 denotes a difference calculation unit which obtains a difference between the feature amount of the acquired image and feature-amount information contained in a background model stored in a storage unit 204 (to be described later) to compare the feature amounts of the background model and the image of the analysis object with each other. The storage unit 204 includes the RAM 103 or secondary storage device 104. The storage unit 204 stores a status at each position of the image as a background model containing feature-amount information that indicates a feature amount extracted by the feature amount extraction unit 202 and likelihood information which indicates a likelihood (to be described later). Note that each position of the image indicates, for example, a pixel, which is represented by coordinates having the upper left corner of the image as the origin. Reference numeral 205 denotes a status determination unit that determines, based on the result of the difference calculation unit 203, whether a status similar to that of the acquired image exists in the status information stored in the storage unit 204. If no status similar to that of the acquired image exists, the unit 205 outputs information indicating it; otherwise, the unit 205 outputs information indicating the similar status. Reference numeral 206 denotes a foreground detection unit which determines based on the result of the status determination unit 205 whether each position of the acquired image is a foreground portion or background portion, and detects a foreground region; and reference numeral 207 denotes a subject determination unit which detects a region where a specific subject to be detected exists from the region which has been determined as the foreground by the foreground detection unit 206. Note that in the embodiment, a case in which the specific subject is a human body will be described. Reference numeral 208 denotes a likelihood calculation unit which calculates, based on the result of the subject determination unit 207, a likelihood that each position of the image is part of a subject; and reference numeral 209 denotes a background model update unit which updates, based on the results of the status determination unit 205 and likelihood calculation unit 208, the background model stored in the storage unit 204.

To distinguish between a foreground portion and a background portion, the information processing apparatus according to the embodiment introduces the concept of a likelihood as an index indicating the probability that a subject (for example, a human body) is represented. The information processing apparatus uses likelihood information and feature-amount information associated with an image previously analyzed to deal with, as the foreground regardless of an elapsed time, a region similar to a past status, which has likelihood information exceeding a certain value, in the region of the acquired image of the analysis object. This prevents a specific subject such as a person from being determined as the background after a certain time elapses, thereby enabling the apparatus to constantly detect the subject.

(Operation Procedure)

Figure 3:
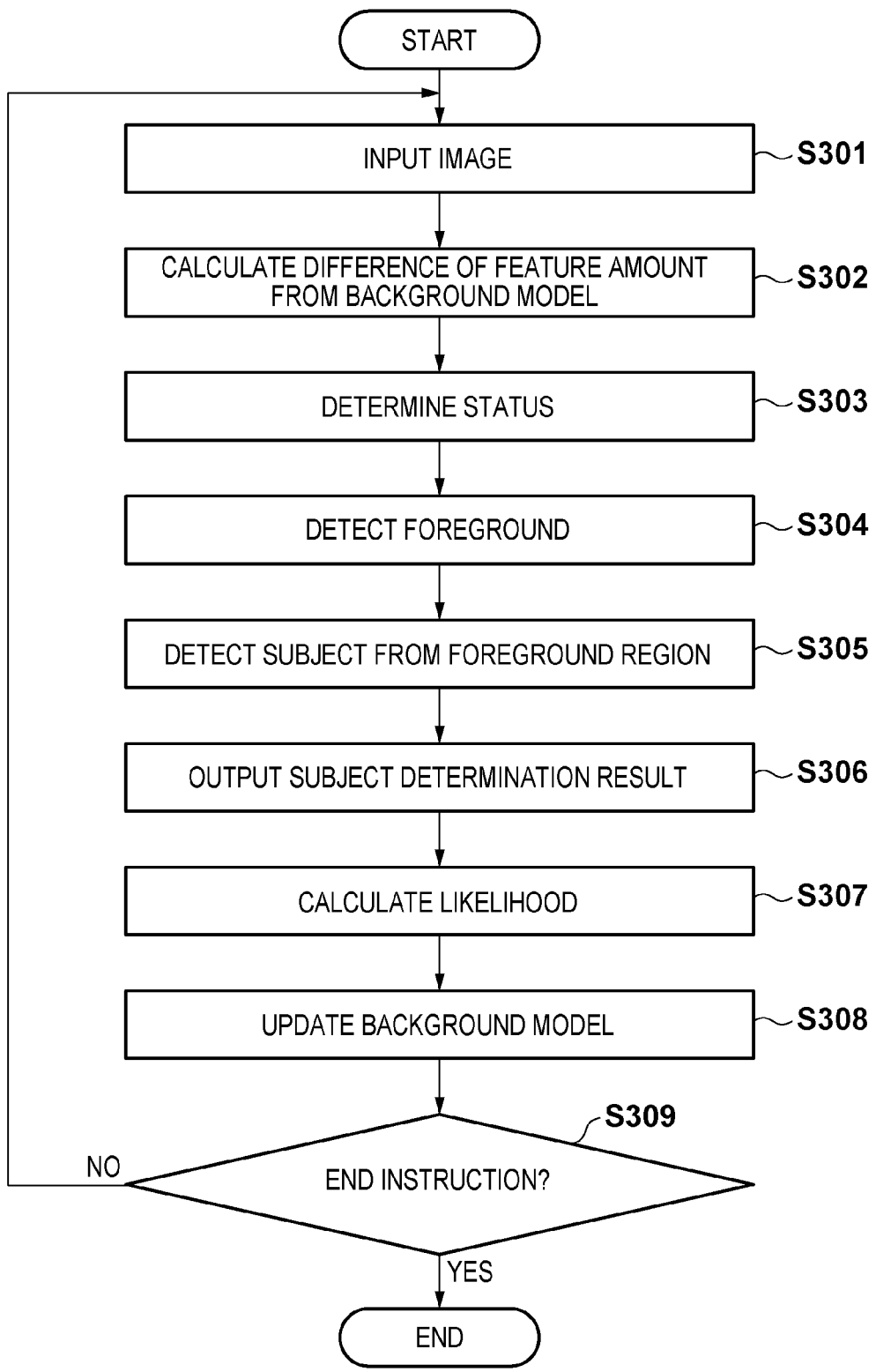
FIG. 3 is a flowchart illustrating the operation of the information processing apparatus according to the embodiment.

An overall processing procedure according to the embodiment will be described with reference to FIG. 3. The image acquisition unit 201 acquires an image captured at a predetermined time interval (step S301). The feature amount extraction unit 202 extracts a feature amount from the acquired image. The difference calculation unit 203 reads out feature-amount information contained in the background model from the storage unit 204, and calculates the difference between the readout information and the feature amount of the acquired image (step S302).

Based on the result of the difference calculation unit 203, the status determination unit 205 determines whether a status similar to that of the acquired image exists in the statuses stored in the storage unit 204. If a similar status exists, it is determined to which one the status is similar (step S303). The foreground detection unit 206 detects a foreground region from the acquired image based on likelihood information contained in the background model, the appearance time of the status, and the like (step S304). Based on an image having features similar to those of a subject, the subject determination unit 207 determines whether the subject exists in the foreground region (step S305). Information about a subject-determination result is then output (step S306). Note that based on the output information, the information processing apparatus can notify the user of the existence of a detection target by displaying a rectangle on the acquired image on the display device 107. The information processing apparatus can also perform intrusion detection or abandoned-object detection based on the output information.

The detection result of the subject determination unit is also input to the likelihood calculation unit 208, which calculates a likelihood based on the detection result of the subject determination unit 207 (step S307). Based on the results of the status determination unit 205 and the likelihood calculation unit 208, the background model update unit 209 updates the background model stored in the storage unit 204 (step S308). Then, a user end instruction such as power-off is determined (step S309). The process in steps S301 to S308 is repeated until an end instruction is given. Note that although an end instruction is determined after step S308 in this procedure, the present invention is not limited to this. If, for example, the power is turned off, the process may be immediately terminated at any step, and information obtained by the last process from step S301 to the termination point may be discarded.

Each step described above is merely an example, and not all the steps may be executed. For example, an image may be acquired (step S301), foreground detection (step S304) may be executed using likelihood information for a previously acquired image, a likelihood may be calculated by a likelihood calculation operation (step S307), and the likelihood information may be updated after the foreground detection (step S308). According to this procedure, by detecting the foreground using the likelihood information, it is possible to continuously and constantly detect, as the foreground, a region where a subject having a high likelihood exists. Using a likelihood previously calculated and stored, it is possible to execute foreground detection at high speed after an image is acquired (step S301).

(Difference-Calculation Process)

Figure 4:
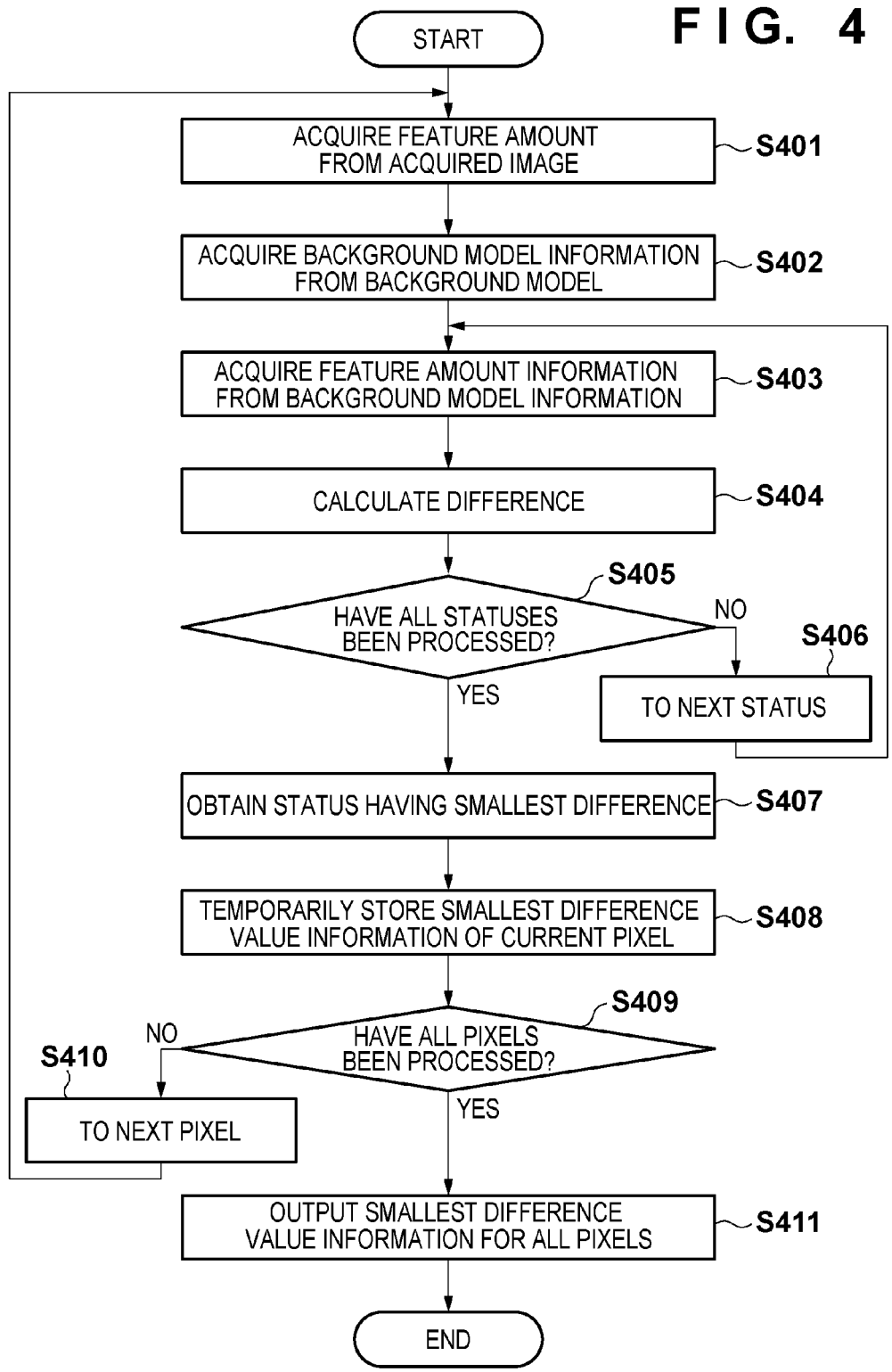
FIG. 4 is a flowchart illustrating the operation of a difference-calculation process.

The difference-calculation process in step S302 will be described in detail with reference to FIG. 4. The feature amount extraction unit 202 extracts a feature amount as a value representing the status of the acquired image at each position (step S401).

For the feature amount, a luminance, color, or edge can be used and a combination of them may be used. The present invention is not specifically limited to them. The feature amount may be extracted for each pixel, or otherwise for each partial region formed by a group of a plurality of pixels. Note that a pixel is distinguished from a partial region in this description. It is not necessary to distinguish between them, and one pixel is also a region in a sense that it occupies a certain range. A feature amount for each partial region includes, for example, the DCT coefficient and the average luminance of pixels within a pixel block with 8×8 pixels. The DCT coefficient is a numerical value obtained by calculating a DCT (Discrete Cosine Transform) for a range of the image for which calculation is performed. If the acquired image has been encoded in a JPEG format, a feature-amount-extraction operation has been completed in the encoding. In this case, a DCT coefficient may be directly obtained from the acquired image in a JPEG format, and may be used as a feature amount. Note that a case in which a luminance for each pixel is used as a feature amount will be described in the embodiment. In the embodiment, starting with the upper left pixel of the image, a subsequent process is executed while moving from left to right and then down by one row (in a raster scanning order). Note that the order of the process is not limited to the raster scanning order, and may be any other orders as long as the process is executed for the whole image.

The difference calculation unit 203 acquires background-model information for the position of a pixel to be processed from the background model stored in the storage unit 204 (step S402).

The background model stored in the storage unit 204 will be described with reference to FIG. 5. The background model represents a status at each position within the image using the feature amount of the image. The background model includes two portions, that is, management information and background-model information. The management information is obtained by associating a position within the image with a pointer to background-model information at the position. The position within the image may be represented by the X-Y position of a pixel of the image or a number assigned to the position of a pixel block with 8×8 pixels in the raster scanning order. Assume that the position of a pixel of the image is represented by an X-Y position in this embodiment.

The background-model information contains information about a status at each position. Note that if a plurality of statuses exist for one position within the image, an element for the background-model information is created for each status. If the background changes upon, for example, the appearance of a new static object such as a vase, a status at a certain position of the image changes. In this case, the storage unit 204 newly creates information about the status at the position, and includes it in the background-model information. As a result, the background-model information contains, for the position, two pieces of information before and after the background changes.

As shown in FIG. 5, the status information in the background-model information contains, for example, a status number, feature-amount information, a creation time, an appearance time, and likelihood information. The status number is sequentially issued from 1, and is used to identify a plurality of statuses for one position within the image. The creation time indicates a time when the status appears for the first time in the acquired image or when information about the status is created for the first time in the background model. The appearance time indicates a total period during which the status or a status similar to it appears in the acquired image from the creation time until now. The creation time and the appearance time are represented by, for example, times or a frame number and the number of frames, respectively. Assume in this embodiment that the creation time is represented by a frame number and the appearance time is represented by the number of frames. The likelihood information has a value indicating a likelihood that the position is part of the subject (a human body in this embodiment). Based on the detection result of the subject determination unit 207, the likelihood calculation unit 208 calculates a likelihood, and stores likelihood information based on the calculated likelihood. Note that the likelihood or likelihood information has a value falling within the range from 0 to 100 and a value of 100 represents a highest likelihood in this embodiment. A method of calculating the likelihood and likelihood information will be described later.

If a plurality of pieces of status information are created for one position of the image, they are stored in the background-model information at sequential addresses of the RAM or secondary storage device. In the example of FIG. 5, for a position (0, 0), a status having a status number 1 is stored at an address 1200, and a status having a status number 2 is stored at an address 1201. By referring to pointers to a position of interest and a next position in the management information, and reading out data from the address of the position of interest to an address immediately before the address of the next position, it is possible to collectively read out a plurality of statuses for the position of interest.

Referring back to FIG. 4, the difference calculation unit 203 acquires a pointer corresponding to a position to be processed from the management information, and acquires all pieces of status information for the position from the background model based on the acquired pointer. In the example of FIG. 5, if the position of interest of the image is (0,0), the difference calculation unit 203 acquires the status number, feature-amount information, the creation time, the appearance time, and likelihood information of information at each of the addresses 1200 and 1201.

The difference calculation unit 203 reads out the feature-amount information for one status from the plurality of pieces of status information for the position to be processed, which have been acquired in step S402 (step S403). The difference calculation unit 203 calculates the difference between a feature amount at the same position of the acquired image and the readout feature-amount information (step S404). To calculate the difference, the absolute value of the difference between the two feature amounts is used in this example. The present invention, however, is not specifically limited to this. For example, the square of the difference, the ratio between the two feature amounts, or the logarithmic value of the ratio may be used. The obtained difference value is temporarily stored in the RAM 103 in association with the position within the image and the target status number for which the difference has been calculated. It is then determined whether there exists status information for the position to be processed for which a difference has not been calculated (step S405). As long as there exists status information for which a difference has not been calculated, feature-amount information for a status for which a difference calculation has not been executed is read out from the plurality of pieces of status information for the position to be processed, which have been acquired in step S402 (step S406), and the process in steps S403 and S404 is repeated.

The difference calculation unit 203 extracts status information having a smallest one (to be referred to as a smallest-difference value hereinafter) of the difference values temporarily stored in step S404 for the position to be processed (step S407). The unit 203 temporarily stores, in the RAM 103, the position within the image, the status number, the creation time, the appearance time, and likelihood information of the extracted status information, and the feature amount of the acquired image in association with the smallest-difference value of the status (step S408). That is, for the status having the smallest-difference value for each position, the difference calculation unit 203 substitutes the feature amount of the acquired image for the feature-amount information, adds the smallest-difference value to it, and temporarily stores the obtained value. Note that the temporarily stored information will be referred to as smallest-difference-value information hereinafter.

FIG. 6 shows an example of the smallest-difference-value information. FIG. 6 shows, for example, a case in which, when using the background model of FIG. 5, the position (0,0) within the image is considered and the feature amount of the acquired image at the position is 105. In this case, there exist two pieces of status information for the position (0,0), as shown in FIG. 5. When status information having a status number "1" is considered, the feature amount in this information is "100". The difference value is |105−100|=5. On the other hand, when a status number is "2", the difference value is |105−230|=125. Therefore, the smallest-difference value is 5, which is presented by the status information having the status number "1". Thus, in the smallest-difference-value information for the position (0,0), a status number is "1", and a creation time "0", an appearance time "300", likelihood information "0", and a smallest-difference value "5" are obtained for the status number. Since the feature amount of the acquired image at the position (0,0) is 105, the feature amount of the acquired image in the smallest-difference-value information for the position (0,0) is also "105".

The difference calculation unit 203 determines whether the process has been executed for all the positions within the image (step S409). If the process has not been executed for all the positions, it advances to a next pixel in the raster scanning order (step S410), and the process in steps S401 to S408 is repeated. After the process in steps S401 to S408 is executed for all the positions, the temporarily stored smallest-difference-value information for all the positions is output to the status determination unit 205 (step S411).

Since the background model is not stored upon the start of the information process according to the embodiment, a smallest-difference value is set to, for example, a maximum possible value. With this operation, statuses at all the positions of the acquired image are determined as new statuses, and stored in the background model, as will be described later. This enables the apparatus to initialize the background model with the acquired image upon power-on.

(Status-Determination Process)

Figure 7:
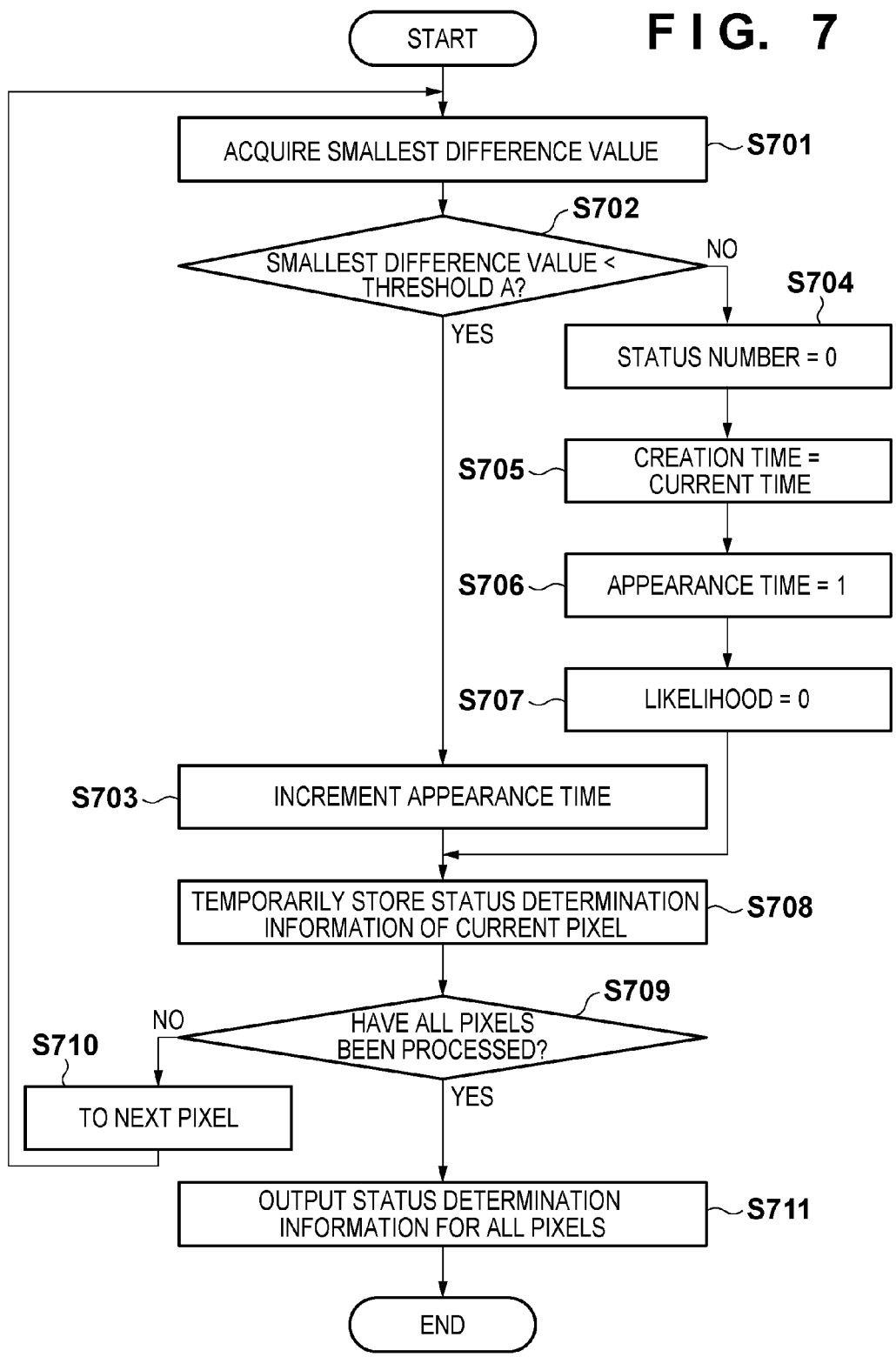
FIG. 7 is a flowchart illustrating the operation of a status-determination process.

The status-determination process executed in step S303 of FIG. 3 will be described in detail with reference to FIG. 7. Upon the start of a process shown in FIG. 7, a position contained in the smallest-difference-value information is referred to by considering the upper left position of the image as a start position, and a smallest-difference value for the position is acquired (step S701). The smallest-difference value for the position to be processed is compared with a first predetermined value (A) (step S702). If the smallest-difference value for the position to be processed is smaller than the first predetermined value, the status determination unit 205 determines that the acquired image is in a status represented by the status number of the smallest-difference-value information. On the other hand, if the smallest-difference value is equal to or larger than the first predetermined value, the status determination unit 205 determines that the acquired image is in a new status different from the statues stored in the background model. Note that as described in details of the difference-calculation process in step S302, for an image upon start of the information processing apparatus, a smallest-difference value is set to a maximum value and all statuses are thus determined as new statuses.

If it is determined in step S702 that the smallest-difference value is smaller than the first predetermined value, the status determination unit 205 increases the appearance time of the smallest-difference-value information for the position to be processed (step S703), and the process advances to step S708. More specifically, since the appearance time is represented by the accumulated number of frames in this embodiment, the appearance time is incremented by one.

If it is determined in step S702 that the smallest-difference value is equal to or larger than the first predetermined value, the status determination unit 205 sets, as a status number, a special number (for example, 0) indicating a new status for the smallest-difference-value information for the position to be processed (step S704). The background model update unit 209 re-issues a status number upon updating the background model, which is a number other than 0. A time when a status having the status number 0 is created for the first time, that is, the current time is set as the creation time of the smallest-difference-value information (step S705). Note that since the creation time is represented by the frame number in the embodiment as described above, the frame number of the acquired image is set as the creation time. Since the status appears only in the current frame, 1 is set as the appearance time of the smallest-difference-value information (step S706). Since subject detection is not performed yet, 0 is set as the likelihood (step S707).

Based on the result of the process in step S703 or steps S704 to S707, the position to be processed, the status number, the feature amount of the acquired image, the creation time, the appearance time, and the likelihood information are temporarily stored as status-determination information in the RAM 103 in association with each other (step S708). It is determined whether the above-described process has been executed for all the positions within the image (step S709). If execution of the process is not complete, the process advances to a next position in the raster scanning order (step S710), and the process in steps S701 to S708 is repeated. If the above-described process is complete for all the positions, status-determination information for all the positions is input to the foreground detection unit 206 and the background model update unit 209 (step S711).

FIG. 8 shows an example of the status-determination information. FIG. 8 shows a case in which, for example, the first predetermined value A is 10 in the example of the smallest-difference-value information of FIG. 6. In this example, since the smallest-difference value is smaller than the first predetermined value for positions (0,0) and (1,0), the status determination unit 205 does not change the status number, the feature amount of the acquired image, the creation time, and the likelihood information, and increments the appearance time by one. On the other hand, since the smallest-difference value is equal to or larger than the first predetermined value for a position (2,0), the unit 205 sets the status number to 0, the creation time to 316 as the number of frames representing the current time, the appearance time to 1, and the likelihood information to 0.

In the status-determination process, the status of the acquired image is obtained by determining whether the storage unit 204 stores feature-amount information close to the feature amount of the acquired image. If the storage unit 204 stores feature-amount information close to the feature amount of the acquired image, the information processing apparatus according to the embodiment uses information corresponding to the feature-amount information to execute a process (to be described later). This limits a target to undergo the process (to be described later), thereby enabling the apparatus to suppress the processing amount as a whole and to increase the execution speed. If the smallest-difference value is equal to or larger than the first predetermined value, it is determined that there is no feature-amount information stored in storage unit 204, which is close to the feature amount of the acquired image, and information about a new status is created. This can prevent the process (to be described later) from being executed based on the feature-amount information stored in the storage unit 204 when the feature amount of the acquired image is not close to any of the pieces of stored feature-amount information.

(Foreground-Detection Process)

The foreground-detection process executed in step S304 of FIG. 3 will be described in detail with reference to FIGS. 9A and 9B. Upon start of the foreground-detection process, a position in the status-determination information is referred to by considering the upper left position of the image as a start position, and the status-determination information for the position is acquired (step S901). Likelihood information is extracted from the status-determination information for the position to be processed, and is compared with a second predetermined value B (step S902). If the likelihood is equal to or larger than the second predetermined value, the foreground detection unit 206 determines the status of the acquired image at the position to be processed as "foreground" which is part of a subject to be detected (step S903).

On the other hand, if the likelihood is smaller than the second predetermined value in step S902, the foreground detection unit 206 cannot confirm that the status of the acquired image at the position to be processed is the foreground. The foreground detection unit 206, therefore, determines based on time information contained in the status-determination information whether the status of the acquired image at the position to be processed is the foreground. For example, it is possible to use, as the time information, an appearance time or an existence time representing a period from when a certain state appears for the first time until now (the difference between the current time and the creation time). Furthermore, other information may be used. Note that a case in which an appearance time is used will be described in this embodiment. The foreground detection unit 206 extracts an appearance time from the status-determination information, and compares it with a third predetermined value C (step S904). If the appearance time is equal to or larger than the third predetermined value, the unit 206 determines that the status of the acquired image at the position to be processed is the background in images captured from the past until now for a sufficiently long time (step S905). On the other hand, if the appearance time is smaller than the third predetermined value, the unit 206 determines, as a result of detecting part of an object which temporarily appears such as a person, bag, or vase, the status of the acquired image at the position to be processed. The unit 206 determines, as the foreground, such an object which temporarily appears (step S903). Note that if the smallest-difference value is equal to or larger than the first predetermined value in the above-described status-determination process, the appearance time of the status-determination information is 1 and the creation time is represented by the current number of frames. Accordingly, the object is detected as the foreground in this step.

Based on the determination result, the foreground detection unit 206 temporarily stores, as foreground-flag information, a foreground flag indicating whether it is the foreground or background for the status of the acquired image at the position to be processed (step S906). FIG. 10 shows an example of the foreground-flag information. A position within the image and a foreground flag are held in association with each other in the foreground-flag information. If the acquired image at the position to be processed has been determined as the foreground in the above-described process, a foreground flag for the position is set to "1". Alternatively, if the acquired image has been determined as the background, the foreground flag is set to "0".

The example of FIG. 10 will be described with reference to FIG. 8. Assume that the second predetermined value B is 60 and the third predetermined value C is 30. In this case, since, for the position (1,0), likelihood information has a value larger than the value B, the foreground is determined (YES in step S902). Since, for the positions (0,0) and (2,0), likelihood information is 0, the foreground is not determined (NO in step S902). On the other hand, for the position (2,0), appearance time is 1 which is smaller than the value C. The foreground is determined for the position (2,0) (YES in step S903). Since, however, for the position (0,0), the appearance time is larger than the value C, the foreground is not determined (NO in step S903). A foreground flag, therefore, is "0" for the position (0,0), and "1" for the positions (1,0) and (2,0).

It is determined whether the process is complete for all the positions within the image (step S907). If the process is not complete, it advances to a next position (step S908), and the process in steps S901 to S906 is repeated. If the process in steps S901 to S906 is complete for all the positions, the foreground detection unit 206 integrates successive positions of the foreground, and transits to a process (steps S909 to S920) of obtaining a region in which the foreground is successively determined.

To integrate pieces of information for a plurality of positions, search flag information indicating whether a position having a foreground flag=1 has been searched is used. Similarly to the foreground-flag information, this information is obtained by associating a search flag with a position within the image. A search flag=1 represents that the position has been searched. The foreground detection unit 206 sets search flags corresponding to all the positions to 0, thereby executing initialization (step S909).

A position contained in the foreground-flag information is referred to by considering the upper left position of the image as a start position, and acquires the foreground flag of the position (step S910). It is checked whether the foreground flag of the current position is 1 (step S911). If the foreground flag is 0, the position is the background, and the process therefore advances from the current position to a next position in the raster scanning order (step S912). For the next position, a foreground flag is acquired (step S910), and is checked (step S911). If the foreground flag is 1 in step S911, the position is determined to be the foreground. In this case, it is checked whether the search flag of the current position is 0, that is, whether the current position has not been searched (step S913). If the search flag is 1, the position has been searched. The process, therefore, advances from the current position to a next position in the raster scanning order (step S912).

If the search flag is 0 in step S913, it is determined that the position has not been searched. In this case, the foreground detection unit 206 temporarily stores the position to be processed (step S914), and sets the search flag of the position to 1 (step S915). To search for a successive position to be the foreground, the foreground flags of neighboring positions are acquired (step S916), and it is checked whether at least one of the neighboring positions has a foreground flag=1 (step S917). The neighboring positions indicate, if the position is represented by a pixel, pixels adjacent to the pixel, and indicate, if the position is represented by a region, other regions adjacent to the region. If at least one of the neighboring positions has a foreground flag=1, it can be determined that there is a position successively determined as the foreground. At the neighboring position having the foreground flag=1, it is determined whether its search flag is 0 (step S918). If the search flag is 0, the neighboring position has not been searched. Therefore, the neighboring position is temporarily stored (step S914), and the search flag is set to 1 (step S915).

A foreground flag is acquired for a position adjacent to the neighboring position (step S916). If the acquired foreground flag is 1, it is checked whether a corresponding search flag is 0. Until a neighboring position having a foreground flag=1 is not found (NO in step S917) or all neighboring positions having a foreground flag=1 are searched (YES in step S917 and NO in step S918), the process in steps S914 to S918 is repeated.

By searching for successive positions as the foreground in the process in steps S914 to S918, a predetermined region is defined by the successive positions. The foreground detection unit 206 obtains a bounding rectangle (to be referred to as "foreground region" hereinafter) including the defined region, and temporarily stores the upper left and lower right positions of the foreground region in the RAM 103 (step S919). Appearance times for the positions are acquired from the status-determination information, and the average of the appearance times is obtained and temporarily stored in the RAM 103 (step S920).

It is determined whether the process in steps S910 to S920 has been executed for all the positions in the image (step S921). If the process has not been executed for all the positions, it advances from the current position to a next pixel in the raster scanning order (step S912). Note that "current position" indicates the position acquired in step S910. If the process in steps S910 to S920 is complete for all the positions, the number of sets of the upper left positions and lower right positions of the foreground regions which have been temporarily stored is counted. Along with the number of foreground regions, the average appearance time and the upper left positions and lower right positions of the foreground regions are temporarily stored as foreground-region information. The foreground-region information is input to the subject determination unit 207 (step S922). FIG. 11 shows an example of the foreground-region information. FIG. 11 shows a case in which the number of foreground regions is 2. The positions and average appearance times of the foreground regions are stored at successive addresses, the beginning of which is represented by a pointer. Referring to FIG. 11, for example, since the number of foreground regions is 2 and the pointer is 1400, it is found that pieces of information of the positions and the average appearance times of the foreground regions are stored at addresses 1400 and 1401.

The above-described foreground-detection process enables the apparatus to distinguish between detection target objects and non-detection targets by always determining a subject (person) having a high likelihood as the foreground, while considering, as the background, an object left behind and having a low likelihood after a certain time elapses. An object which temporarily appears is continuously detected as the foreground for at least a predetermined period. By, for example, displaying the detection result on the display device 107, it is possible to notify the user of a change in the image. By obtaining a foreground region, and not executing a process (to be described later) for a region other the foreground region, it is possible to improve the detection accuracy and to reduce the processing amount as a whole.

(Subject Determination Process)

Figure 12:
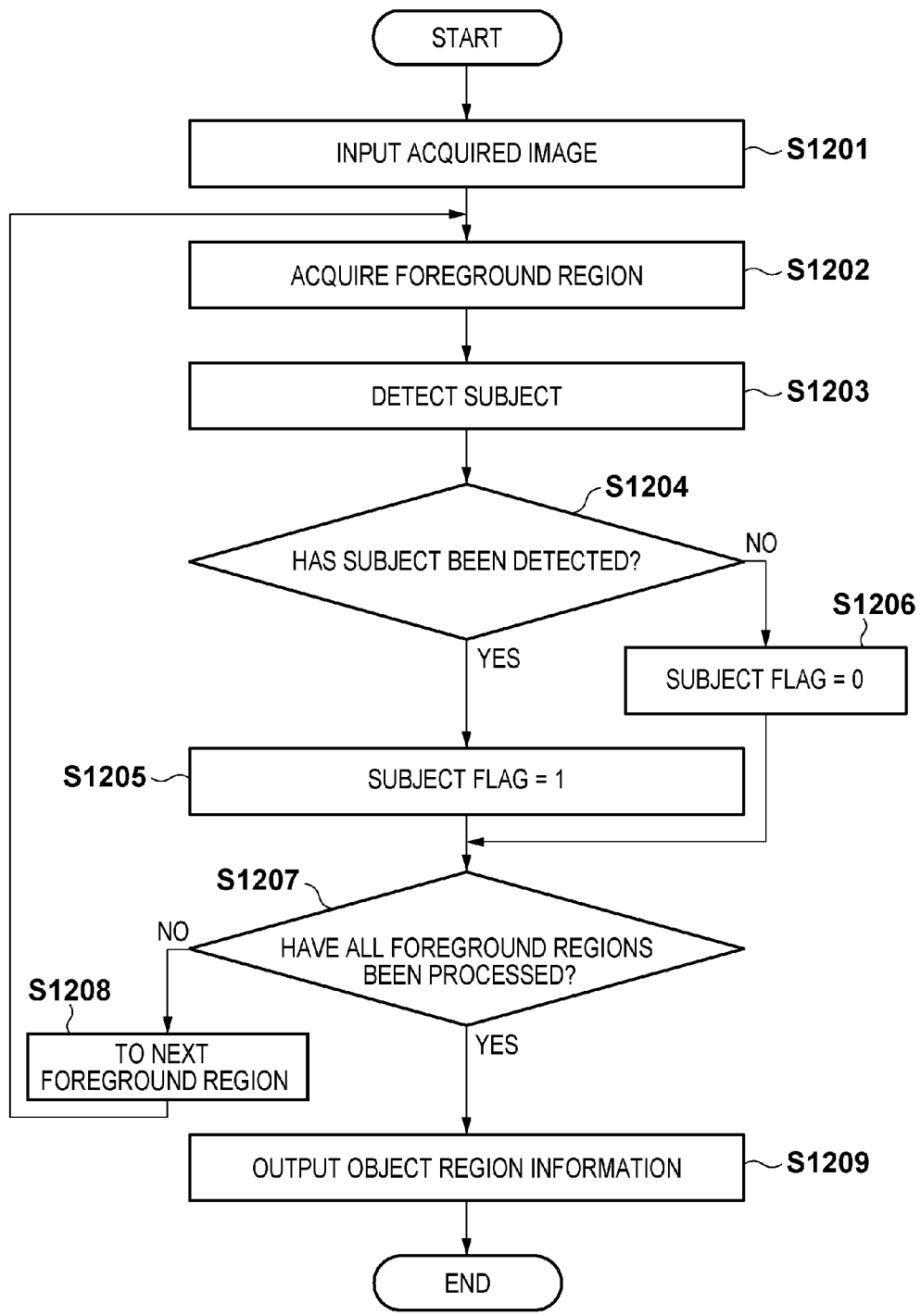
FIG. 12 is a flowchart illustrating the operation of a subject-detection process.

The subject determination process executed for the foreground region in step S305 of FIG. 3 and output of an object region executed in step S306 will be described in detail with reference to FIG. 12. In the subject determination process, the subject determination unit 207 executes a subject-detection process for the foreground region to determine whether a subject exists in the region. Upon start of the process, the acquired image is input to the subject determination unit 207 (step S1201). Information about the position of one foreground region is acquired from the foreground-region information obtained in the foreground-detection process in step S304 (step S1202). Then, a subject-detection processing is executed for a region specified by the information about the position (step S1203).

For the subject-detection process, for example, U.S. Publication No. 2007/0237387 describes a method of detecting a human body. In U.S. Publication No. 2007/0237387, a detection window having a predetermined size is caused to scan an input image and to extract an image, thereby determining whether the extracted pattern image is a subject. Furthermore, in U.S. Publication No. 2007/0237387, a classifier used to make the determination is formed by a combination of a number of weak classifiers. Using AdaBoost as a statistical learning method to execute learning and determination in each weak classifier improves the classification accuracy of the whole process. Each weak classifier is configured to execute learning and determination based on an HoG (Histogram of oriented gradients) feature amount. Note that the HoG feature amount is represented as a histogram showing the gradient direction of the luminance of a local region. In U.S. Publication No. 2007/0237387, the classifiers are series-connected to form a cascade detector. The cascade detector uses a simple classifier at a preceding stage, and removes pattern candidates which are obviously not a subject. The classifier of the succeeding stage having a higher identification performance is applied to candidates that have not been removed by the classifier of the preceding stage to determine whether the candidates are a subject.

The subject determination unit 207 determines whether a subject has been detected in the foreground region in step S1203 (step S1204), adds a subject flag to the foreground region, and temporarily stores it in the RAM 103 or the like. For a foreground region where a subject has been detected, the subject flag is set to 1 (step S1205). For a foreground region where no subject has been detected, the subject flag is set to 0 (step S1206). The subject determination unit 207 determines whether the process has been executed for all the foreground regions contained in the foreground-region information (step S1207). If the process is not complete, it advances to a next foreground region (step S1208), and the process in steps S1202 to S1206 is repeated. If the process is complete for all the foreground regions, the above-described foreground-region information added with the subject flag is output as object-region information (step S1209). The object-region information is output to the outside of the information processing apparatus according to the embodiment and the likelihood calculation unit 208.

FIG. 13 shows an example of the object-region information. The object-region information contains the number of object regions, a pointer, and detailed information of each object region. The detailed information of each object region is obtained by adding a subject flag to the position and the average appearance time of a foreground region. The pointer in the object-region information is used to access the detailed information of each object region. In the example of FIG. 13, two object region data are sequentially stored from an address 1600 pointed by the pointer to an address 1601.

Note that the object-region information output from the information processing apparatus according to the embodiment is, for example, used as follows. An apparatus for detecting intrusion of a subject into a region designated by the user within a screen acquires only object regions having a subject flag=1 from the object-region information. The apparatus determines based on the upper left position and lower right position of the object region whether a subject has intruded into a range designated by the user. An apparatus for detecting an object left behind acquires only object regions having a subject flag=0. If the average appearance time of the object regions exceeds a time designated by the user, the apparatus detects the object region as such an object. As described above, the information processing apparatus can execute both detection of an object which is desirably temporarily detected, such as abandoned-object detection, and detection of a subject, which is desirably always detected.

In the above description, if the average appearance-time information is not used because, for example, detection of a remaining object is not executed, and the average appearance times in the foreground-region information and object-region information may be omitted. This can save the memory capacity of the RAM 103 or the like.

(Likelihood-Calculation Process)

The likelihood-calculation process executed in step S307 of FIG. 3 will now be described. In the subject determination unit 207, an object region (to be referred to as "subject region" hereinafter) having a subject flag=1 is a region where there exists a target to always be detected as a subject. This region, therefore, may be always determined as the foreground in the foreground-detection process. In an information process according to the embodiment, by reflecting the subject-determination result to the background model as a likelihood, the foreground-detection process always detects a region having a high likelihood as the foreground even though the region does not change.

In the subject-determination result of the subject determination unit 207, error detection, in which an object that should not essentially be detected is detected, may occur. If, therefore, the subject region is considered as the foreground intact, the accuracy of the background model may deteriorate. Depending on a subject, the whole object region is not always determined as the subject. Assume that the subject is a human body in this embodiment. Since the common features of a human body are mainly its contours, a rectangular region defined as an object region probably includes a background region other than a human body. To achieve high-accuracy determination in the foreground-detection process, it is necessary to distinguish between a subject and the background within the object region, and to remove the influence of the background. For these reasons, for each position in the image, the process according to the embodiment calculates a likelihood indicating the probability that an object region is part of a human body, and adds it to the background model. The above problems are solved by dealing with, as the foreground, only pixels having a high likelihood in the foreground-detection process as described above.

Three examples of a likelihood-calculation method will be described below. Note that the likelihood-calculation method is not limited to them, and any method may be used as long as it is possible to obtain a likelihood at each position.

<First Method: Method of Using Likelihood Distribution Based on Learning Image>

To cause each weak classifier forming the above-described subject determination unit 207 to function, machine learning such as AdaBoost learning (see U.S. Publication No. 2007/0237387) based on sample images is necessary. In this learning, a correct image (positive sample) having features similar to those of a subject and an incorrect image (negative sample) having different features are used as sample images. An image having similar features is, for example, an image in which a person exists if the subject is a human body, and an image in which a bag exists if the subject is the bag. In the machine learning, the classifier is caused to learn the common features (contours and the like) of a human body as a subject, and therefore, a plurality of images having a predetermined size in which the positions of a head and feet are aligned are used as correct images.

Figure 14:
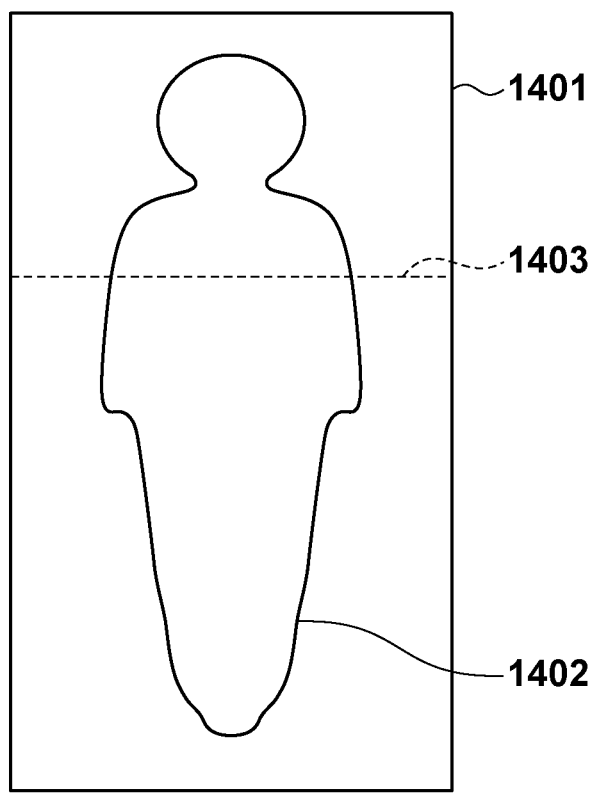
FIG. 14 is a view showing an example of a likelihood-distribution image.
Figure 15:
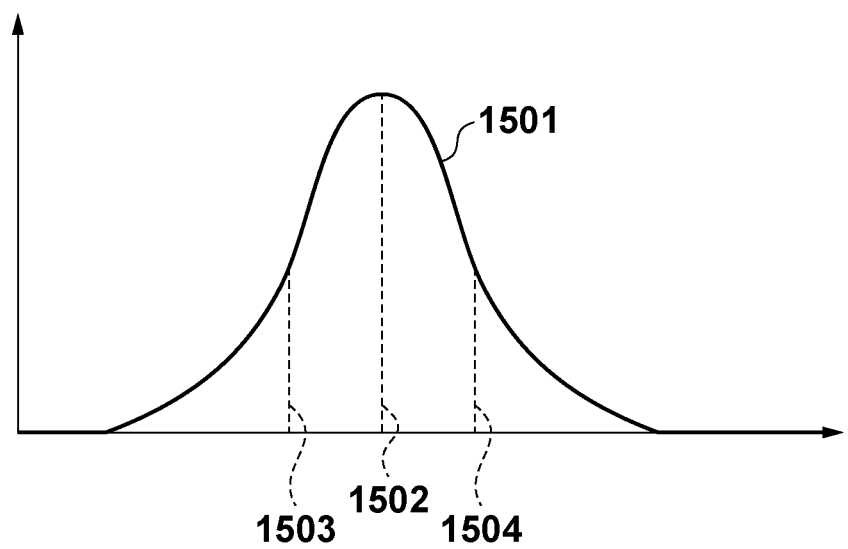
FIG. 15 is a graph showing an example of likelihoods in the likelihood-distribution image.

The first method calculates the probability of a human body at each position in the detected region using the correct images. This calculation method will be described in detail with reference to FIG. 14, which shows a likelihood distribution. Reference numeral 1401 denotes the whole region including a correct image. The first method obtains a density gradient indicating the degree of a change in each pixel value for the correct image, and averages the density gradients for the whole correct image. Based on the averaging result, the boundary of a region having a density strength equal to or larger than a predetermined threshold is calculated. Reference numeral 1402 denotes the thus calculated boundary. That is, a pixel which is positioned inside the boundary 1402 and is farther from the boundary 1402 has a higher probability that it exists inside the contours of a human body in the correct image, and is probably a human body. In the first method, the probability of a human body is represented as, for example, a likelihood distribution, and is used to calculate a likelihood in a subject region. Assume that the likelihood distribution conforms to a normal distribution as shown in FIG. 15. The abscissa in FIG. 15 represents a position on an additional line 1403 of FIG. 14 and the ordinate in FIG. 15 represents a likelihood. Reference numeral 1501 denotes a curve representing a likelihood distribution conforming to a normal distribution; reference numeral 1502 denotes an average in the likelihood distribution; and reference numerals 1503 and 1504 denote positions separated from the average by a standard deviation. Note that a likelihood at the position of the average 1502 is a possible maximum value of the likelihood, for example, 100. The likelihood distribution is determined by, in the whole region 1401, respectively aligning the positions 1503 and 1504 with the intersections of the additional line 1403 and the boundary 1402, and aligning the position of the average 1502 with the midpoint between the intersections. As described above, it is possible to calculate likelihoods at all the positions within the whole region 1401 using a statistical method based on the correct image including a subject (human body). In the first method, a likelihood-distribution image in which the calculated likelihood at each position is defined as a pixel value is prepared. This likelihood-distribution image is stored in the ROM 102 or secondary storage device 104 in advance, and is loaded into the RAM 103 upon the start of the information processing apparatus according to the embodiment, thereby enabling the likelihood calculation unit 208 to refer to it.

Figure 16:
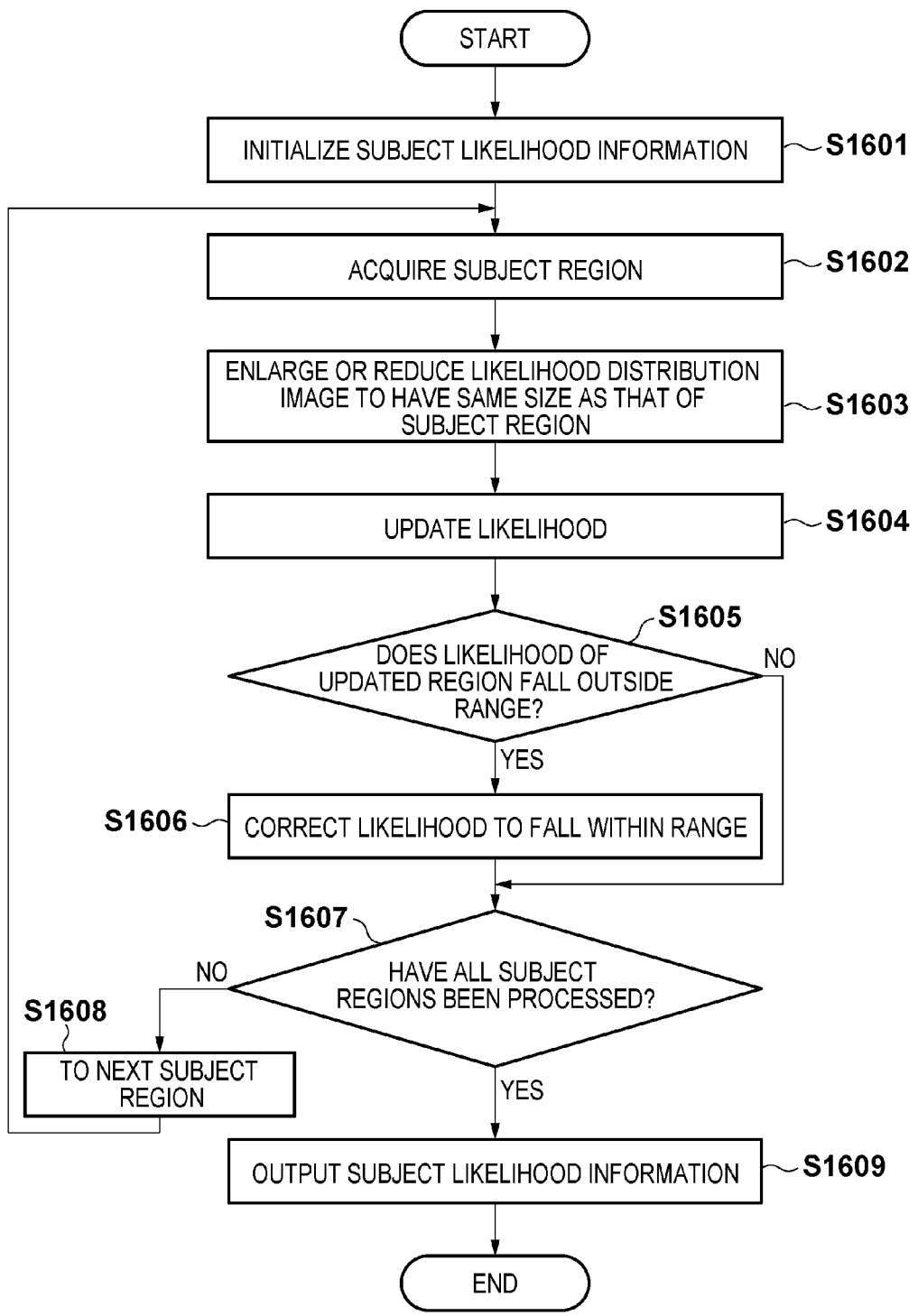
FIG. 16 is a flowchart illustrating the operation of a first method of a likelihood-calculation process.

The operation of the first method will be described with reference to a flowchart shown in FIG. 16. Subject likelihood information is initialized first (step S1601). The subject likelihood information is obtained by storing each position of the image and a corresponding likelihood in association with each other, as exemplified in FIG. 18. The likelihoods for all the positions are set to 0, thereby initializing the information. One subject region is acquired from the object-region information (step S1602).

The above-described likelihood-distribution image is determined based on an image used in learning, and therefore, has the same size as that of the image used in learning. The likelihood calculation unit 208 enlarges or reduces the likelihood-distribution image to have the same size as that of the subject region (step S1603). This enlargement or reduction operation is executed using a nearest-neighbor method or linear interpolation, like normal image enlargement or reduction.

The likelihood of a region corresponding to the subject region is updated based on a likelihood as the pixel value of the likelihood-distribution image, the size of which has been changed. More specifically, at a corresponding position, the sum of the likelihood of the subject likelihood information and the pixel value of the likelihood-distribution image is obtained, and is set as a new likelihood value (step S1604). At this time, if it is immediately after initialization of the subject likelihood information (step S1601), the likelihoods for all the positions are 0, and therefore, the pixel values of the likelihood-distribution image are set as the likelihoods at the positions. On the other hand, in a region including a plurality of subject regions, the sum of the likelihood calculated in step S1604 for another subject region and the pixel value of the likelihood-distribution image is set as a likelihood. It is then checked whether the likelihood value updated in step S1604 falls outside a value range (from 0 to 100) (step S1605). If the likelihood value falls outside the range, it is corrected to fall within the range (for example, to be 100) (step S1606). It is determined whether the process in steps S1602 to S1606 is complete for all subject regions (step S1607). If the process is not complete, it advances to a next subject region (step S1608); otherwise, final subject likelihood information is output to the background model update unit 209 (step S1609).

As in the first method, by preparing a likelihood-distribution image in which likelihoods are statistically calculated based on a correct image in advance, and applying the likelihood-distribution image to a subject region of the acquired image, it is possible to readily calculate a likelihood at high speed.

<Second Method: Estimation Method Based on Accumulated Score in Subject Determination Process>

The subject determination unit 207 calculates an accumulated score by:

$$F(x) = \sum_t a_t h_t(x) \quad (1)$$

By determining whether the accumulated score exceeds a threshold, it is finally determined whether the region is a subject (see U.S. Publication No. 2007/0237387). Note that $a_t$ represents the reliability of each weak classifier, x represents the position of a detection window, and $h_t(x)$ represents a function which takes +1 when a t-th weak classifier determines a region as a subject, and takes −1 when the classifier classifies a region as a non-subject. Note that t (t=1 to T) weak classifiers exist. Furthermore, $a_t$ represents a value indicating the reliability of each weak classifier. That is, the accumulated score is obtained by calculating a weighted sum of the results of the plurality of classifiers for the acquired image. This value indicates the extent to which the acquired image is considered to have the features of a subject. If, therefore, a region has the accumulated score equal to or larger than the threshold, it can be determined that the region includes the subject at a sufficiently high probability.

The accumulated score F(x) does not directly indicate the probability that the subject is included in the output result. The accumulated score is converted using the sigmoid function, and the obtained value is considered as a probability P(y=+1|x) that the subject is included in the output result.

$$P(Y=+1|x) = 1/(1 + \exp(-w_1 F(x) - w_0)) \quad (2)$$

Note that the weights $w_1$ and $w_0$ of the sigmoid function are obtained by actually executing detection for a plurality of sample images for which a correct position (the position of a subject) has been found, and using a least squares method based on the relationship between the accumulated score and the subject detection results.

Figures 17, 18, 19:
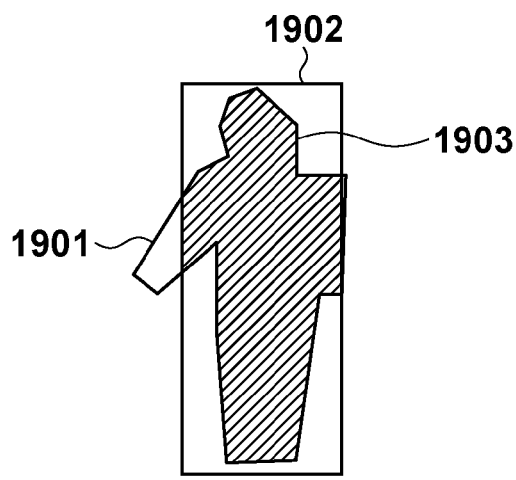
FIG. 17 is a table showing an example of accumulated-score information.
FIG. 18 is a table showing an example of likelihood information.
FIG. 19 is a view showing an example of an overlap between a subject region and a region specified by a foreground flag.

For each detection window before determining a subject region, the subject determination unit 207 outputs, as accumulated-score information, the accumulated score in association with the center position of the detection window. FIG. 17 shows an example of the accumulated-score information. Referring to FIG. 17, "position" represents the center of a detection window within the image. The likelihood calculation unit 208 can obtain subject likelihood information by multiplying the probability calculated by equation (2) by 100 to convert into a percentage, and then obtaining the converted value as a likelihood.

As described above, using, as a likelihood, the accumulated score as the extent to which the acquired image is considered to have the features of a subject, a region which is considered to have the features of the subject at a high probability is assigned with a high likelihood. It is, therefore, possible to detect the subject with high accuracy in the foreground-detection process.

<Third Method: Method of Using Overlap between Subject Region and Region Determined by Foreground Flag>

Although a likelihood in an image being processed is directly obtained in the first and second methods, a likelihood is obtained by accumulating likelihood-calculation results in the likelihood calculation unit 208 in the third method. One process by the likelihood calculation unit 208 calculates a likelihood displacement by time-differentiating an accumulated value. The background model update unit 209 reflects the likelihood displacement on the likelihood information in the background model, as will be described later.

More specifically, the likelihood calculation unit 208 provides a predetermined value as the likelihood displacement for a pixel or region determined as a subject. If, for example, the predetermined value is set to 10 and a subject exists at the same pixel in successive 10 frames, the likelihood information for the pixel is 100 obtained by calculating 10 (the predetermined value)×10 (the number of frames).

When a subject-determination result includes a background portion as a human body, the subject determination unit 207 cannot obtain a high-accuracy likelihood if a given value is simply assigned to the whole subject region. In this case, the following operation is executed.

Figure 9A:
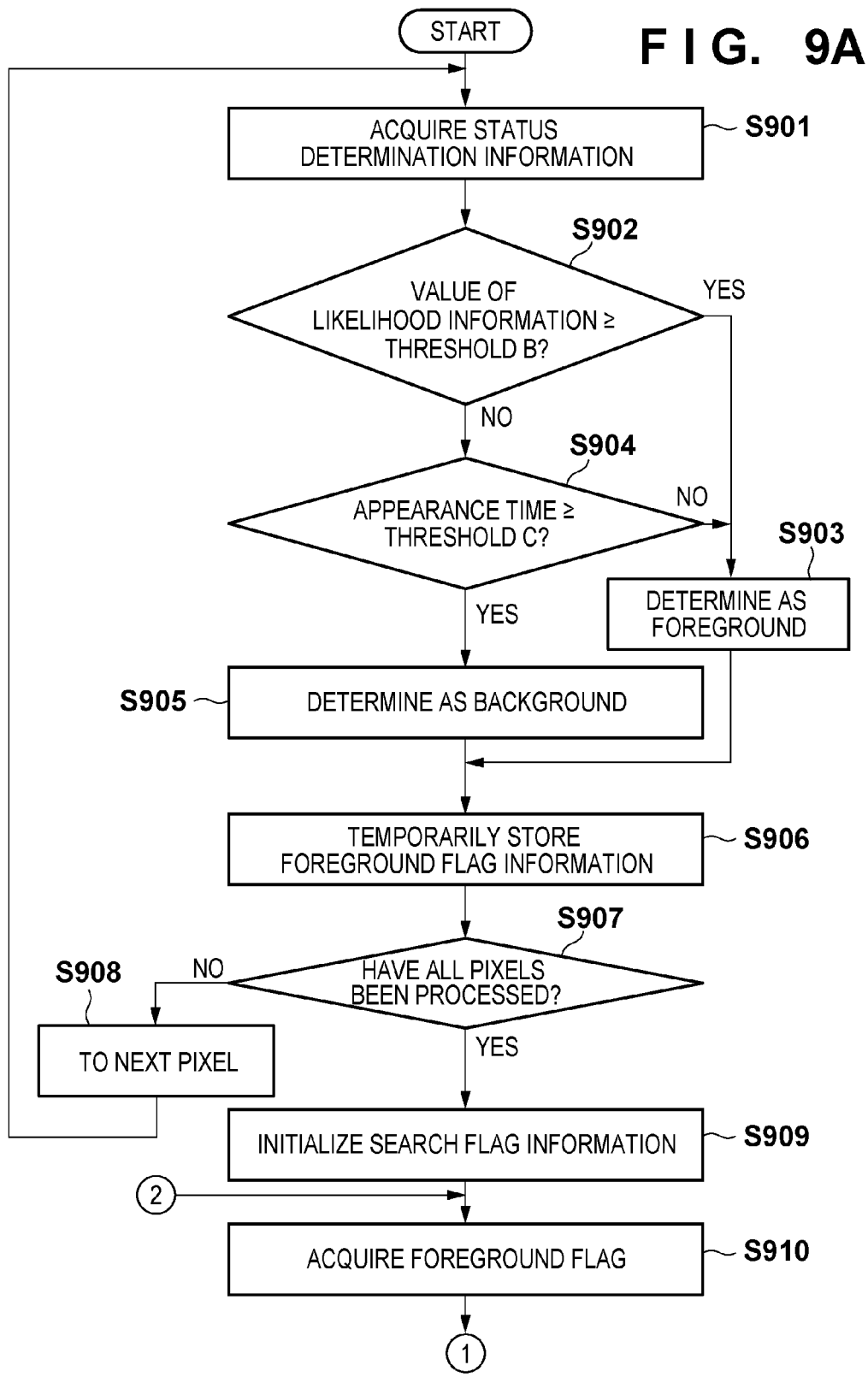
FIGS. 9A and 9B are flowcharts illustrating the operation of a foreground-detection process.
Figure 9B:
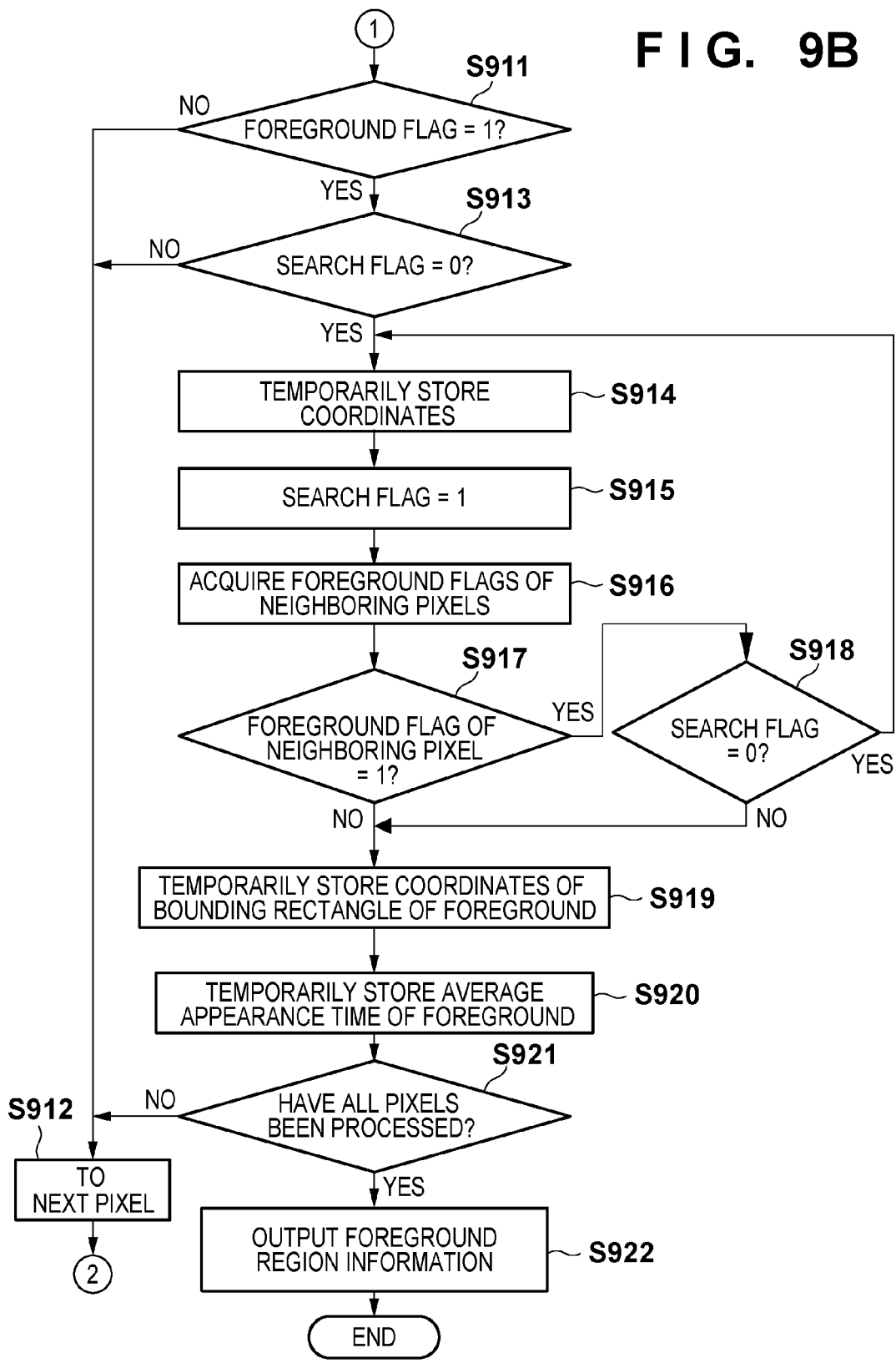

The likelihood calculation unit 208 acquires foreground-flag information generated upon end of the process in steps S901 to S906 of FIG. 9A by the foreground detection unit 206. The likelihood calculation unit 208 obtains an overlapping region determined by an AND operation of positions where a foreground flag obtained from the foreground-flag information is 1 and a subject region where a subject flag obtained from the object-region information is 1. FIG. 19 shows an example. A region 1901 represented by a polygon is specified by the foreground detection unit 206 based on positions, the foreground flags of which have been set to 1. A region 1902 represented by a rectangle is a subject region. A hatched region 1903 is an overlapping region which is included in the region specified by the positions, the foreground flags of which have been set to 1, and is also the subject region. The likelihood calculation unit 208 sets a predetermined value D as a likelihood displacement. A region 1904 other than the overlapping region within the subject region 1902 is considered as a region corresponding to the background, and is therefore considered to have a low subject likelihood. The likelihood calculation unit 208 thus assigns, as a likelihood displacement, a negative value −D to this region. This has an effect of cancelling, if a subject existed in the preceding frame in the region and a positive likelihood displacement was assigned, the displacement with the result of a current frame.

Figure 20:
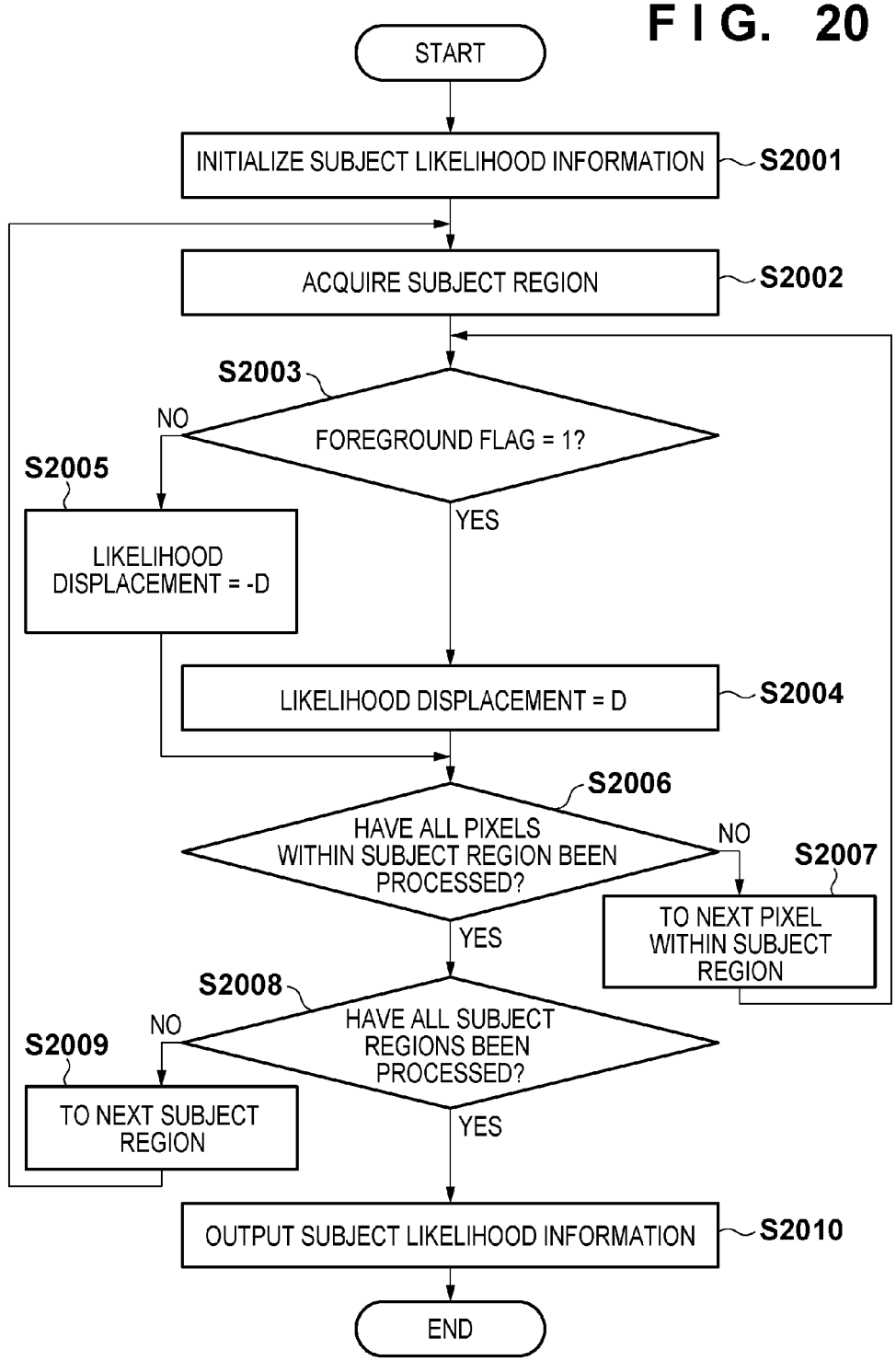
FIG. 20 is a flowchart illustrating the operation of a third method of the likelihood-calculation process.

The third method will be described in detail with reference to a flowchart shown in FIG. 20. The likelihood calculation unit 208 initializes subject likelihood information (step S2001). Note that in the third method, a displacement is stored in this process instead of a likelihood itself, as described above. One subject region is acquired from the object-region information (step S2002). It is determined based on the foreground-flag information output from the foreground detection unit 206 whether each position within the subject region is the foreground or background (step S2003). The likelihood calculation unit 208 extracts a region which is the subject region and the foreground region, and determines a likelihood displacement based on the extraction result. More specifically, the process starts from a corner such as the upper left position within the subject region, foreground-flag information for each position is acquired, and it is checked whether a foreground flag is 1 (step S2003). If the foreground flag is 1, the position is in an overlapping region between the foreground and the subject region, the predetermined positive value D is assigned as a likelihood displacement. If the foreground flag is 0, the position is considered in a background region, and the predetermined negative value −D is assigned as a likelihood displacement. Note that in addition to setting of the likelihood displacement to −D for a region which has a foreground flag=0 in the subject region, a likelihood displacement for a region other than the subject region may be set to −D. This can suppress the likelihood value for the region other than the subject, thereby preventing error detection in which the region other than the subject is detected as the subject.

It is determined whether the process in steps S2003 to S2005 has been executed for all pixels within the subject region (step S2006). If the process is not complete, it advances to a next pixel in the raster scanning order within the subject region (step S2007). Then, the process in steps S2003 to S2005 is repeated. If the process is complete, it is determined whether the process in steps S2002 to S2007 is complete for all subject regions (step S2008). If the process is not complete, it advances to a next subject region (step S2009); otherwise, final subject likelihood information is output to the background model update unit 209 (step S2010).

In the above description, a likelihood displacement is set to a negative value for a region that is a subject region and has a foreground flag=0. The same may go for a region other than a subject region. By decreasing the likelihood for a pixel or region other than a subject region, which does not have a likelihood=0, it is possible to reduce the probability that the pixel or region is erroneously detected as the foreground in the foreground-detection process.

(Background-Model Update Process)

Figure 21:
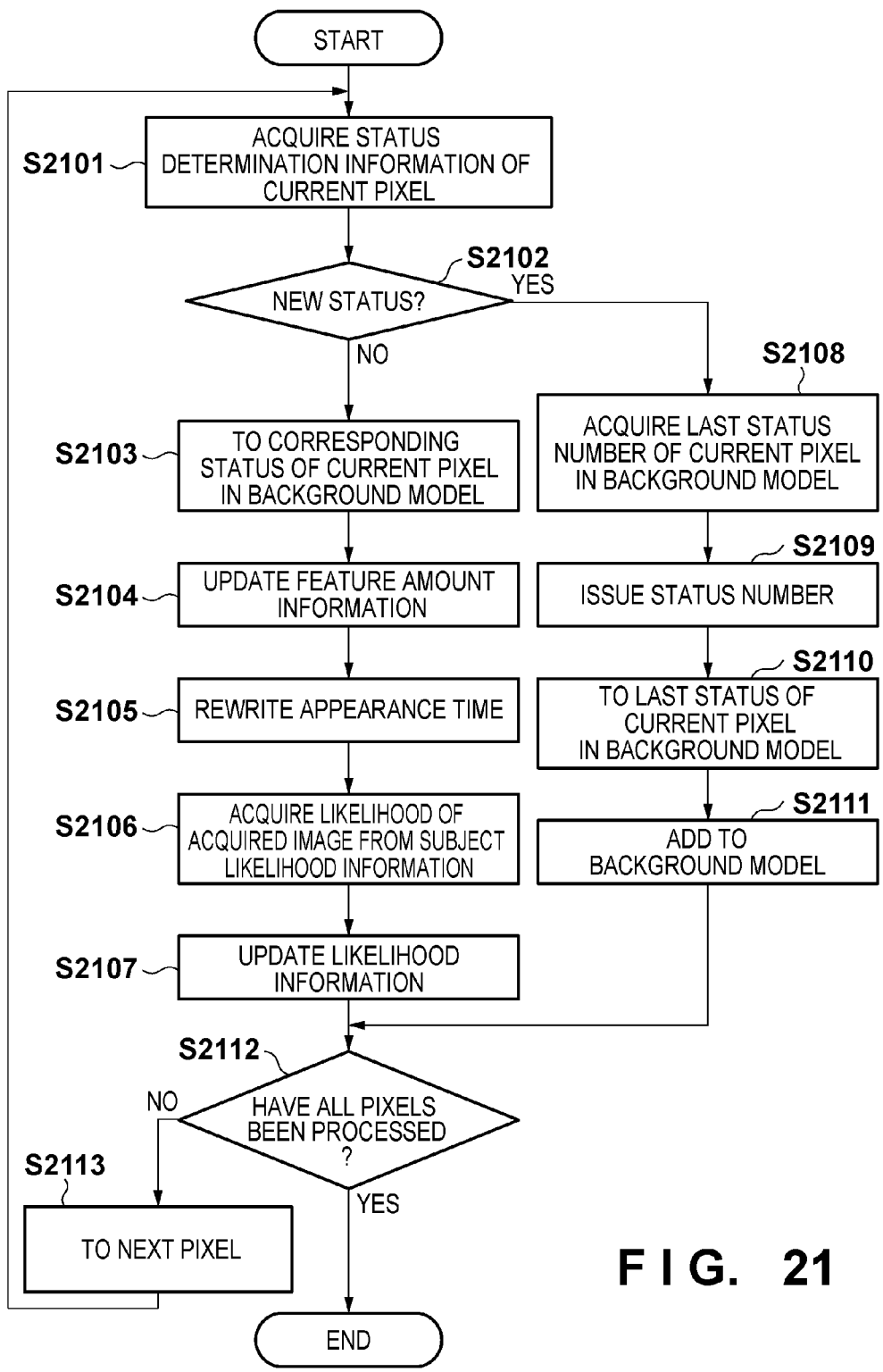
FIG. 21 is a flowchart illustrating the operation of a background model update process.

The background-model update process in step S308 will be described in detail with reference to FIG. 21. Starting with the upper left position of the image, the background model update unit 209 acquires status-determination information corresponding to each position (step S2101). It is then checked whether a status at the position to be processed is a new status (step S2102). More specifically, the background model update unit 209 refers to a status number contained in the status-determination information. If the status number is 0, the status is determined as a new status; otherwise, the status is determined as an existing status in the background model.

If the status is an existing status (NO in step S2102), the background-model information is updated with respect to the existing status. More specifically, the background-model update unit 209 acquires a pointer from the background model management information, and then acquires background-model information containing the same status number as that contained in the status-determination information (step S2103). The feature-amount information in the background model is updated with the feature amount of the acquired image of the status-determination information. The feature-amount information is updated according to:

$$\mu_t = (1-\alpha)\cdot\mu_{t-1} + \alpha\cdot I_t \qquad (3)$$

where t represents the current frame, t−1 represents the immediately preceding frame, $\mu_{t-1}$ represents the value of the feature-amount information before the update operation, $\mu_t$ represents the value of the feature-amount information after the update operation, $I_t$ represents the value of the feature amount of the acquired image, and α is a weight having a value of 0 to 1. As α is a larger value, a larger influence of the input value acts on the value after the update operation, thereby increasing the conformance to a variation in image. To the contrary, as α is a smaller value, a larger influence of a past value acts on the value after the update operation, thereby improving the convergence performance. Note that by setting α to 1, the feature-amount information stored in the storage unit 204 may be replaced by the feature-amount of the acquired image.

The above-described update operation makes the feature-amount information conform to a change in feature amount of the acquired image over time, thereby preventing an object in the image from being determined as the foreground due to a change in illumination even though the object does not move.

The background model update unit 209 updates the appearance time of the background model (step S2105). Since the appearance time is in the latest status in the status determination unit 205, the appearance time of the background-model information in the background model is replaced by that of the status-determination information.

The process advances to a likelihood information update operation. In the likelihood information update operation, a likelihood for the position to be processed is acquired from the subject likelihood information containing the likelihoods calculated for the acquired image (step S2106). The likelihood information stored in the storage unit 204 is updated based on the likelihoods acquired from the likelihood information and the subject likelihood information (step S2107). As an update method, there are a method of using an exponential smoothing method similarly to the feature-amount information update operation, and a method of using an approximate median filtering method. More specifically, the exponential smoothing method is executed according to:

$$\theta_{M,t} = (1-\beta)\cdot\theta_{M,t-1} + \beta\cdot\theta_{1,t} \qquad (4)$$

where t represents the current frame, t−1 represents the immediately preceding frame, $\theta_{M,t-1}$ represents the value of the likelihood information in the background model before the update operation, $\theta_{M,t}$ represents the value of the likelihood information after the update operation, $\theta_{1,t}$ represents a value calculated by the likelihood calculation unit 208 for the current acquired image, and β represents a weight having a value of 0 to 1. As β is a larger value, it more strongly depends on a value calculated based on the image being currently processed, thereby improving the following performance. To the contrary, as β is a smaller value, the dependency on the value calculated based on the image being currently processed reduces, thereby improving the convergence performance.

Furthermore, the approximate median filtering method satisfies:

$$\theta_{M,t} = \theta_{M,t-1} + \delta, \text{ if } \theta_{M,t} > \theta_{M,t-1} \qquad (5)$$

$$\theta_{M,t} = \theta_{M,t-1} - \delta, \text{ if } \theta_{M,t} < \theta_{M,t-1} \qquad (6)$$

$$\theta_{M,t} = \theta_{M,t-1}, \text{ if } \theta_{M,t} = \theta_{M,t-1} \qquad (7)$$

Note that for an arbitrary value of t, $0 \leq \theta_{M,t} \leq 100$ and $\delta$ is a predetermined value. By increasing/decreasing the value within its range, it does not overshoot even if the likelihood abruptly changes. $\delta$ may be different depending on equation (5) for increasing the value or equation (6) for decreasing the value.

By updating the likelihood information based on the likelihood information and the likelihood of the acquired image, it is possible to present sufficiently high likelihood information for a subject that continuously appears, while decreasing the influence of an object, which momentarily appears, on the likelihood information.

As described in the third method, when calculating a likelihood displacement in the likelihood calculation unit 208, an update operation is executed according to:

$$\theta_{M,t} = \theta_{M,t-1} + \Delta\theta_{1,t} \quad (8)$$

For an arbitrary value of t, $0 \leq \theta_{M,t} \leq 100$. In equation (8), $\Delta\theta_{1,t}$ represents a likelihood displacement, and can take a negative value as described above. That is, when using the third method, the likelihood information stored in the background model is updated by adding a likelihood displacement. This increases the value of the likelihood information of a pixel or region as a subject, thereby enabling to detect the subject with high accuracy. Furthermore, using a negative value as a likelihood displacement suppresses a likelihood value for a region other than the subject, thereby enabling to further improve the accuracy of detecting the subject.

On the other hand, in step S2102, if the status is determined as a new status, it is added to the background model. With respect to a position to be processed, the management information in the background model is referred to, and a pointer to an address of the background-model information is acquired. Then, the last status number of the background-model information which corresponds to the position is acquired (step S2108), and a status number corresponding to the new status is issued (step S2109). More specifically, for example, if the value of the last status number is "3", a status number corresponding to the new status will be a next value "4". Note that when adding a status to the background model for the first time, for example, upon start of the information processing apparatus according to the embodiment, "1" is assigned as a status number.

The process advances to an operation of assigning an address to the new background-model information. The new background-model information is added after the last background-model information for the position corresponding to the new background-model information. The address of the first background-model information for a position next to the position corresponding to the new background-model information in the background model before the update operation becomes the address of the new background-model information in the background model after the update operation. The background model update unit 209, therefore, refers to management information corresponding to the next position, and acquires a pointer stored in the management information (step S2110). Then, the unit 209 inserts the new background-model information at an address indicated by the pointer (step S2111). The feature amount, creation time, and appearance time of the acquired image contained in the status-determination information are stored as the feature-amount information, creation time, and appearance time of the new background-model information, and the number issued in step S2109 is stored as a status number. The value calculated by the likelihood calculation unit 208 is stored as likelihood information. Note that since statuses at all the positions of the acquired images are new statuses upon start of the process in the information processing apparatus, all the statuses at the positions are added to the background model, thereby initializing the background model.

It is determined whether the process in steps S2101 to S2111 has been executed for all the positions within the image (step S2112). If execution is not complete, the process advances to a next position in the raster scanning order (step S2113), and the process in steps S2101 to S2111 is repeated. If execution is complete, the process ends.

The process of updating the background model reflects the latest image result to the likelihood information together with time information added to each status of the background model. Determination by the foreground detection unit 206, therefore, is appropriately executed. That is, it becomes possible to always detect a person (a subject in this embodiment) who stands still, thereby enabling to temporarily detect a static object such as a bag and to automatically execute a background process after a certain time elapses.

Although, in the above-described embodiment, the process is executed for all the positions acquired by a camera or the like, the present invention is not limited to this. For example, the above-described process may be executed for a partial region such as the upper half of the acquired image. This can omit the process for a portion where a wall or the like constantly obstructs a person's view.

According to the present invention, using a likelihood indicating the probability of being a subject in a predetermined pixel or region of an acquired image, it is possible to continuously detect, as the foreground, a region which is considered as a subject at a high probability.

Although each device is connected by the bus 109 in FIG. 1, some devices may be connected by the network I/F 108. For example, the image acquisition device may be connected by the network I/F 108 to input an image.

The units 202 to 209 may be arranged in an integrated circuit chip to form the image acquisition device 105. Alternatively, only the subject determination unit 207 may be arranged on the PC, and may be configured to receive an image and foreground-region information (FIG. 11) via a LAN cable or the like, and to transmit object-region information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106628 filed on May 11, 2011, which is hereby incorporated by reference herein in its entirety.

What is claimed is:

1. An information processing apparatus comprising:
a storage unit configured to store, as background model information, for each of a plurality of predetermined regions, feature amount information of a past acquired image and likelihood information indicating a probability that a subject is represented;
an acquisition unit configured to acquire an image of an analysis object;
an extraction unit configured to extract a feature amount from each region of the acquired image;
a detection unit configured to detect a foreground region from the acquired image based on the likelihood information contained in the background model information and a result of comparing the feature amount extracted from the acquired image with the feature amount information contained in the background model information;
a calculation unit configured to calculate, for each detected foreground region, a likelihood indicating a probability that the detected foreground region represents the subject, based on information prepared for the subject; and
an update unit configured to update the likelihood information contained in the background model information with the calculated likelihood.

2. The apparatus according to claim 1, wherein
said storage unit stores at least one piece of background model information for each of a plurality of predetermined regions,
the apparatus further comprises a difference calculation unit configured to calculate, as a smallest difference value, for each region of the acquired image, a smallest one of difference amounts between the extracted feature amount and the pieces of feature amount information contained in the respective pieces of background model information corresponding to the region, and
said detection unit detects, as a foreground region, a region of the acquired image whose smallest difference value is smaller than a first predetermined value and has the likelihood information, contained in the background model, that is larger than a second predetermined value.

3. The apparatus according to claim 2, wherein
for the region that has the smallest difference value not less than the first predetermined value, said storage unit stores, as the background model information corresponding to the region in addition to background model information already stored in association with the region, the extracted feature amount extracted by said extraction unit as feature amount information, and the likelihood calculated by said calculation unit as liklihood information for the acquired image.

4. The apparatus according to claim 2, wherein
with respect to the region that has the smallest difference value that is smaller than the first predetermined value, said update unit updates the feature amount information contained in the background model information, corresponding to the region having the smallest difference value that is smaller than the first predetermined value, with the feature amount extracted by said extraction unit.

5. The apparatus according to claim 2, wherein
said storage unit stores, as an appearance time, a total time during which it is determined that a difference between the feature amount information contained in the background model and a feature amount of the acquired image is the smallest difference value and the smallest difference value is smaller than the first predetermined value, after a time when the likelihood information and the feature amount information are stored as the background model information for the first time or a time when an image which presents the likelihood information and the feature amount information is acquired for the first time, and
said detection unit detects, as a foreground portion without depending on the likelihood information, the region which has the smallest difference value smaller than the first predetermined value and for which the appearance time of the background model information corresponding thereto and containing the feature amount information used to determine the smallest difference value therefor is shorter than a predetermined period.

6. The apparatus according to claim 2, wherein
said storage unit stores, as a creation time, a time when the likelihood information and the feature amount information are stored as the background model information for the first time or a time when an image which presents the likelihood information and the feature amount information is acquired for the first time, and
said detection unit detects, as a foreground region without depending on the likelihood information, the region which has the smallest difference value smaller than the first predetermined value and for which a time difference between a current time and the creation time of the background model information containing the feature amount information used to determine the smallest difference value therefor is shorter than a predetermined period.

7. The apparatus according to claim 2, wherein
said detection unit detects, as a foreground portion without depending on the likelihood information, a region which has the smallest difference value not less than the first predetermined value.

8. The apparatus according to claim 2, further comprising
a determination unit configured to determine, for a foreground region which has been detected by said detection unit, based on information prepared in advance related to the subject, whether the foreground region includes the subject,
wherein said calculation unit calculates, for the foreground region which has been determined by said determination unit to include the subject, a positive predetermined value as a likelihood, and
wherein said update unit updates the likelihood information of the background model containing the feature amount used to determine the smallest difference value with a value obtained by adding the likelihood to the likelihood information.

9. The apparatus according to claim 8, wherein
said calculation unit calculates, for a region which has not been detected as a foreground region by said detection unit, a negative predetermined value as a likelihood.

10. The apparatus according to claim 1, wherein
said calculation unit calculates the likelihood for a detected foreground region by applying a likelihood distribution associated with a plurality of images having features similar to those of the subject to a predetermined region containing the detected foreground region.

11. A non-transitory computer-readable storage medium storing a computer program for causing a computer to function as each unit of the information processing apparatus according to claim 1.

12. The apparatus according to claim 1, wherein the information prepared for the subject is a likelihood distribution calculated based on learning samples.

13. The apparatus according to claim 1, further comprises a determination unit configured to determine whether a subject exists in the detected foreground region.

14. The apparatus according to claim 13, wherein the information prepared for the subject is a score for determining whether a subject exists in the detected foreground region.

15. The apparatus according to claim 13, wherein the information prepared for the subject is a likelihood displacement for the subject.

16. The apparatus according to claim 14, wherein
said determination unit includes a plurality of classifiers configured to classify the detected foreground region on the basis of whether the detected foreground region includes the subject, and the score is obtained by calculating, using a reliability of each classifier, a weighted sum of classification results by the plurality of classifiers.

17. An information processing method for an information processing apparatus which includes a storage unit configured to store, as background model information, for each of a plurality of predetermined regions, feature amount information of a past acquired image and likelihood information indicating a probability that a subject is represented, the method comprising:
    acquiring an image of an analysis object;
    extracting a feature amount from each region of the acquired image;
    comparing the feature amount extracted from the acquired image with the feature amount information contained in the background model information, and detecting a foreground region from the acquired image based on the likelihood information contained in the background model information;
    calculating, for each detected foreground region, a likelihood indicating a probability that the detected foreground region represents the subject, based on information prepared for the subject; and
    updating the likelihood information contained in the background model information with the calculated likelihood.

* * * * *